(12) United States Patent
Schleder et al.

(10) Patent No.: US 11,243,421 B2
(45) Date of Patent: Feb. 8, 2022

(54) ELECTRICALLY CONTROLLABLE PRIVACY GLAZING WITH ENERGY RECAPTURING DRIVER

(71) Applicant: Cardinal IG Company, Eden Prairie, MN (US)

(72) Inventors: Nicholas Schleder, Saint Paul, MN (US); Michael Eul, Grant, MN (US); Chad Peters, Prior Lake, MN (US); Hari Atkuri, Plymouth, MN (US)

(73) Assignee: Cardinal IG Company, Eden Prairie, MN (US)

( * ) Notice: Subject to any disclaimer, the term of this patent is extended or adjusted under 35 U.S.C. 154(b) by 257 days.

(21) Appl. No.: 16/407,950

(22) Filed: May 9, 2019

(65) Prior Publication Data

US 2019/0346710 A1    Nov. 14, 2019

Related U.S. Application Data

(60) Provisional application No. 62/669,005, filed on May 9, 2018.

(51) Int. Cl.
*G02F 1/03* (2006.01)
*G02B 26/00* (2006.01)
(Continued)

(52) U.S. Cl.
CPC ........ *G02F 1/13318* (2013.01); *G02F 1/0136* (2013.01); *G02F 1/1335* (2013.01);
(Continued)

(58) Field of Classification Search
CPC ...... G02F 1/1523; G02F 1/1533; G02F 1/155; G02F 1/0102; G02F 1/163; G09G 3/16
(Continued)

(56) References Cited

U.S. PATENT DOCUMENTS 3,951,846 A    4/1976    Gavrilovic
3,953,630 A    4/1976    Roberts et al.
(Continued)

FOREIGN PATENT DOCUMENTS

CN    201226062 Y    4/2009
CN    101775953 A    7/2010
(Continued)

OTHER PUBLICATIONS

Bortolozzo et al., Abstract of "Transmissive Liquid Crystal Light-valve for Near-Infrared Applications," Appl. Opt., 52(22), Aug. 2013, accessed on the internet at https://www.osapublishing.org/ao/abstract.cfm?uri=ao-52-22- E73, retrieved Sep. 26, 2019, 2 pages.
(Continued)

*Primary Examiner* — Dawayne Pinkney
(74) *Attorney, Agent, or Firm* — Fredriksen & Byron, P.A.

(57) ABSTRACT

A driver for an electrically dynamic structure may store and release energy during polarity cycling to improve the energy efficiency of operation. In some examples, the driver includes an energy storage element. In operation, the driver can charge an electrically controllable optically active material to a first operating voltage at a first polarity and subsequently discharge the optically active material during polarity reversal. The driver may store energy released from the optically active material during discharging and subsequently release the energy to charge the optically active material to a second operating voltage at a second polarity different than the first polarity.

25 Claims, 16 Drawing Sheets

(51) Int. Cl.
*G02F 1/15* (2019.01)
*G02F 1/153* (2006.01)
*G02F 1/133* (2006.01)
*G02F 1/01* (2006.01)
*G02F 1/1335* (2006.01)
*G02F 1/1365* (2006.01)
*G02F 1/139* (2006.01)
*G09G 3/36* (2006.01)

(52) U.S. Cl.
CPC .......... *G02F 1/1365* (2013.01); *G02F 1/1393* (2013.01); *G09G 3/3614* (2013.01); *G09G 3/3696* (2013.01)

(58) Field of Classification Search
USPC ......... 359/245–246, 237, 265–275, 242, 277
See application file for complete search history.

(56) References Cited

U.S. PATENT DOCUMENTS

| | | |
|---|---|---|
| 4,047,351 A | 9/1977 | Derner et al. |
| 4,150,877 A | 4/1979 | Kobale et al. |
| 4,277,294 A | 7/1981 | Orcutt |
| 4,284,677 A | 8/1981 | Herliczek |
| 4,465,340 A | 8/1984 | Suganuma |
| 4,587,784 A | 5/1986 | Chavy et al. |
| 4,614,676 A | 9/1986 | Rehfeld |
| 4,702,566 A | 10/1987 | Tukude |
| 4,749,261 A | 6/1988 | McLaughlin et al. |
| 4,932,608 A | 6/1990 | Heidish et al. |
| 4,958,917 A | 9/1990 | Hashimoto et al. |
| 5,076,673 A | 12/1991 | Lynam et al. |
| 5,103,336 A | 4/1992 | Sieloff |
| 5,111,329 A | 5/1992 | Gajewski et al. |
| 5,111,629 A | 5/1992 | Baughman et al. |
| 5,142,644 A | 8/1992 | Vansteenkiste et al. |
| 5,151,824 A | 9/1992 | O'Farrell |
| 5,154,953 A | 10/1992 | De Moncuit et al. |
| 5,164,853 A | 11/1992 | Shimazaki |
| 5,168,387 A | 12/1992 | Asakura et al. |
| 5,197,242 A | 3/1993 | Baughman et al. |
| 5,202,787 A | 4/1993 | Byker et al. |
| 5,239,406 A | 8/1993 | Lynam |
| 5,244,557 A | 9/1993 | Defendini et al. |
| 5,408,353 A | 4/1995 | Nichols et al. |
| 5,589,958 A | 12/1996 | Lieb |
| 5,643,644 A | 7/1997 | Demars |
| 5,668,663 A | 9/1997 | Varaprasad et al. |
| 5,766,755 A | 6/1998 | Chaussade et al. |
| 5,796,452 A | 8/1998 | Pierson |
| 5,855,638 A | 1/1999 | Demars |
| 5,889,608 A | 3/1999 | Buffat et al. |
| 6,001,487 A | 12/1999 | Ladang et al. |
| 6,055,088 A | 4/2000 | Fix et al. |
| 6,061,105 A | 5/2000 | Nakagawa |
| 6,064,509 A | 5/2000 | Tonar et al. |
| 6,143,209 A | 11/2000 | Lynam |
| 6,261,652 B1 | 7/2001 | Poix et al. |
| 6,280,041 B1 | 8/2001 | Unger et al. |
| 6,297,900 B1 | 10/2001 | Tulloch et al. |
| 6,317,248 B1 | 11/2001 | Agrawal et al. |
| 6,340,963 B1 | 1/2002 | Anno et al. |
| 6,366,391 B1 | 4/2002 | Hurtz |
| 6,373,618 B1 | 4/2002 | Agrawal et al. |
| 6,407,847 B1 | 6/2002 | Poll et al. |
| 6,466,298 B1 | 10/2002 | Fix et al. |
| 6,486,928 B1 | 11/2002 | Lin et al. |
| 6,567,708 B1 | 5/2003 | Bechtel et al. |
| 6,589,613 B1 | 7/2003 | Kunert |
| 6,594,067 B2 | 7/2003 | Poll et al. |
| 6,621,534 B2 | 9/2003 | Lin et al. |
| 6,639,708 B2 | 10/2003 | Elkadi et al. |
| 6,643,050 B2 | 11/2003 | Rukavina et al. |
| 6,671,008 B1 | 12/2003 | Li et al. |
| 6,671,080 B2 | 12/2003 | Poll et al. |
| 6,795,226 B2 | 9/2004 | Agrawal et al. |
| 6,819,467 B2 | 11/2004 | Lynam |
| 6,829,074 B2 | 12/2004 | Terada et al. |
| 6,829,511 B2 | 12/2004 | Bechtel et al. |
| 6,842,276 B2 | 1/2005 | Poll et al. |
| 6,950,221 B1 | 9/2005 | Terada et al. |
| 7,002,720 B2 | 2/2006 | Beteille et al. |
| 7,009,665 B2 | 3/2006 | Li et al. |
| 7,023,600 B2 | 4/2006 | Mallya et al. |
| 7,033,655 B2 | 4/2006 | Beteille et al. |
| 7,081,929 B2 | 7/2006 | Furuki et al. |
| 7,085,609 B2 | 8/2006 | Bechtel et al. |
| 7,173,750 B2 | 2/2007 | Rukavina |
| 7,230,748 B2 | 6/2007 | Giron et al. |
| 7,300,166 B2 | 11/2007 | Agrawal et al. |
| 7,423,664 B2 | 9/2008 | Ukawa |
| 7,502,156 B2 | 3/2009 | Tonar et al. |
| 7,505,188 B2 | 3/2009 | Niiyama et al. |
| 7,525,714 B2 | 4/2009 | Poll et al. |
| 7,542,809 B2 | 6/2009 | Bechtel et al. |
| 7,671,948 B2 | 3/2010 | Ninomiya |
| 7,719,751 B2 | 5/2010 | Egerton et al. |
| 7,738,155 B2 | 6/2010 | Agrawal et al. |
| 7,746,534 B2 | 6/2010 | Tonar et al. |
| 7,817,327 B2 | 10/2010 | Derda |
| 7,822,490 B2 | 10/2010 | Bechtel et al. |
| 7,872,791 B2 | 1/2011 | Karmhag et al. |
| 7,876,400 B2 | 1/2011 | Baliga et al. |
| 7,906,203 B2 | 3/2011 | Hartig |
| 7,960,854 B2 | 6/2011 | Paulus et al. |
| 7,990,603 B2 | 8/2011 | Ash et al. |
| 8,102,478 B2 | 1/2012 | Xue |
| 8,164,818 B2 | 4/2012 | Collins et al. |
| 8,169,587 B2 | 5/2012 | Bolton |
| 8,187,682 B2 | 5/2012 | Albrecht et al. |
| 8,189,254 B2 | 5/2012 | Voss et al. |
| 8,199,264 B2 | 6/2012 | Veerasamy |
| 8,213,074 B1 | 7/2012 | Shrivastava et al. |
| 8,218,224 B2 | 7/2012 | Kwak et al. |
| 8,219,217 B2 | 7/2012 | Bechtel et al. |
| 8,263,228 B2 | 9/2012 | Torr |
| 8,289,609 B2 | 10/2012 | Lamine et al. |
| 8,343,571 B2 | 1/2013 | Werners et al. |
| 8,355,112 B2 | 1/2013 | Bolton |
| 8,482,838 B2 | 7/2013 | Sbar et al. |
| 8,547,624 B2 | 10/2013 | Ash et al. |
| 8,551,603 B2 | 10/2013 | Thompson |
| 8,610,992 B2 | 12/2013 | Varaprasad et al. |
| 8,619,204 B2 | 12/2013 | Saitoh et al. |
| 8,643,933 B2 | 2/2014 | Brown |
| 8,711,465 B2 | 4/2014 | Bhatnagar et al. |
| 8,810,889 B2 | 8/2014 | Brown |
| 8,869,493 B2 | 10/2014 | Chubb et al. |
| 8,913,215 B2 | 12/2014 | Yang et al. |
| 8,941,788 B2 | 1/2015 | Brecht et al. |
| 8,970,810 B2 | 3/2015 | Bowser et al. |
| 8,975,789 B2 | 3/2015 | Snyker et al. |
| 8,995,039 B2 | 3/2015 | Bartug et al. |
| 9,019,588 B2 | 4/2015 | Brown et al. |
| 9,036,242 B2 | 5/2015 | Bergh et al. |
| 9,091,868 B2 | 7/2015 | Bergh et al. |
| 9,097,842 B2 | 8/2015 | Van Nutt et al. |
| 9,102,124 B2 | 8/2015 | Collins et al. |
| 9,128,346 B2 | 9/2015 | Shrivastava et al. |
| 9,158,173 B2 | 10/2015 | Bhatnagar et al. |
| 9,176,357 B2 | 11/2015 | Lam et al. |
| 9,193,135 B2 | 11/2015 | Boote et al. |
| 9,316,883 B2 | 4/2016 | Sbar et al. |
| 9,333,728 B2 | 5/2016 | Veerasamy |
| 9,341,015 B2 | 5/2016 | Fernando et al. |
| 9,341,909 B2 | 5/2016 | Egerton et al. |
| 9,389,454 B2 | 7/2016 | Yamaguchi et al. |
| 9,400,411 B2 | 7/2016 | Poix et al. |
| 9,436,054 B2 | 9/2016 | Brown et al. |
| 9,436,055 B2 | 9/2016 | Shrivastava et al. |
| 9,442,341 B2 | 9/2016 | Shrivastava et al. |
| 9,477,130 B2 | 10/2016 | Dubrenat et al. |
| 9,494,717 B2 | 11/2016 | Reymond et al. |

(56) References Cited

U.S. PATENT DOCUMENTS

| | | |
|---|---|---|
| 9,550,457 B2 | 1/2017 | Green et al. |
| 9,568,799 B2 | 2/2017 | Lam et al. |
| 9,581,877 B2 | 2/2017 | Bass et al. |
| 9,606,411 B2 | 3/2017 | Bergh et al. |
| 9,606,412 B2 | 3/2017 | Geerlings et al. |
| 9,618,819 B2 | 4/2017 | Egerton et al. |
| 9,618,820 B2 | 4/2017 | Conklin et al. |
| 9,625,783 B2 | 4/2017 | Bjornard et al. |
| 9,664,976 B2 | 5/2017 | Rozbicki |
| 9,690,162 B2 | 6/2017 | Wilbur et al. |
| 9,726,925 B2 | 8/2017 | Relot et al. |
| 9,766,496 B2 | 9/2017 | Cammenga et al. |
| 9,810,963 B2 | 11/2017 | Gauthier et al. |
| 9,829,763 B2 | 11/2017 | Friedman et al. |
| 9,857,657 B2 | 1/2018 | Ash et al. |
| 9,891,454 B2 | 2/2018 | Zhang et al. |
| 9,927,609 B2 | 3/2018 | Cammenga et al. |
| 9,939,702 B2 | 4/2018 | Bjornard |
| 9,952,481 B2 | 4/2018 | Rozbicki et al. |
| 9,958,750 B2 | 5/2018 | Parker et al. |
| 9,958,751 B2 | 5/2018 | Bergh et al. |
| 9,963,383 B2 | 5/2018 | Veerasamy |
| 9,971,194 B2 | 5/2018 | Brecht et al. |
| 9,989,822 B2 | 6/2018 | Galstian |
| 2004/0233379 A1 | 11/2004 | Kinoshita et al. |
| 2005/0002081 A1 | 1/2005 | Beteille et al. |
| 2005/0132558 A1 | 6/2005 | Hennessy et al. |
| 2005/0233125 A1 | 10/2005 | Anderson et al. |
| 2008/0089073 A1 | 4/2008 | Hikmet |
| 2008/0317977 A1 | 12/2008 | Wu |
| 2009/0246426 A1 | 10/2009 | Wu |
| 2009/0279004 A1 | 11/2009 | Greenall et al. |
| 2009/0303565 A1 | 12/2009 | Karmhag et al. |
| 2010/0028585 A1 | 2/2010 | Shimatani |
| 2010/0279125 A1 | 11/2010 | Buyuktanir et al. |
| 2011/0007253 A1 | 1/2011 | Stocq |
| 2011/0181820 A1 | 7/2011 | Watanabe |
| 2012/0086904 A1 | 4/2012 | Oki et al. |
| 2012/0094118 A1 | 4/2012 | Oki et al. |
| 2012/0327499 A1 | 12/2012 | Parker et al. |
| 2013/0107563 A1 | 5/2013 | McCabe et al. |
| 2013/0118918 A1 | 5/2013 | Servida |
| 2013/0265511 A1 | 10/2013 | Poix et al. |
| 2013/0271814 A1 | 10/2013 | Brown |
| 2013/0335802 A1* | 12/2013 | Kim .................. G02F 1/155 359/270 |
| 2014/0020851 A1 | 1/2014 | Ouzts et al. |
| 2014/0204294 A1 | 7/2014 | Lv |
| 2014/0211129 A1 | 7/2014 | Bowser et al. |
| 2014/0247475 A1 | 9/2014 | Parker et al. |
| 2015/0049270 A1 | 2/2015 | Zhang et al. |
| 2015/0049378 A1 | 2/2015 | Shrivastava et al. |
| 2015/0103389 A1 | 4/2015 | Klawuhn et al. |
| 2015/0116649 A1 | 4/2015 | Watanabe |
| 2015/0118869 A1 | 4/2015 | Brown et al. |
| 2015/0151613 A1 | 6/2015 | Weng |
| 2015/0219975 A1 | 8/2015 | Phillips et al. |
| 2015/0277165 A1 | 10/2015 | Burrows et al. |
| 2015/0346575 A1 | 12/2015 | Bhatnagar et al. |
| 2015/0370140 A1 | 12/2015 | Bertolini |
| 2015/0378189 A1 | 12/2015 | Kim et al. |
| 2016/0026061 A1 | 1/2016 | O'Keeffe |
| 2016/0085129 A1 | 3/2016 | Cammenga et al. |
| 2016/0085131 A1 | 3/2016 | Lam et al. |
| 2016/0096344 A1 | 4/2016 | Kurihara |
| 2016/0124284 A1 | 5/2016 | O'Keeffe |
| 2016/0138328 A1 | 5/2016 | Behmke et al. |
| 2016/0161818 A1 | 6/2016 | Gregard et al. |
| 2016/0187753 A1 | 6/2016 | Sbar et al. |
| 2016/0243773 A1 | 8/2016 | Wang |
| 2016/0312523 A1 | 10/2016 | Miyasaka et al. |
| 2016/0363831 A1 | 12/2016 | Ash et al. |
| 2016/0377951 A1 | 12/2016 | Harris |
| 2017/0028686 A1 | 2/2017 | Wilson et al. |
| 2017/0122028 A1 | 5/2017 | Suzuka et al. |
| 2017/0139302 A1 | 5/2017 | Tonar |
| 2017/0152702 A1 | 6/2017 | Chang et al. |
| 2017/0218686 A1 | 8/2017 | Galstian |
| 2017/0219908 A1 | 8/2017 | Brown et al. |
| 2017/0328121 A1 | 11/2017 | Purdy et al. |
| 2017/0371218 A1 | 12/2017 | Kailasam et al. |
| 2018/0011383 A1 | 1/2018 | Higashihara et al. |
| 2018/0095337 A1 | 4/2018 | Rozbicki et al. |
| 2018/0101080 A1 | 4/2018 | Gauthier et al. |
| 2018/0307111 A1 | 10/2018 | Le Houx et al. |
| 2019/0137796 A1 | 5/2019 | Bjergaard et al. |

FOREIGN PATENT DOCUMENTS

| | | |
|---|---|---|
| CN | 203858432 U | 10/2014 |
| CN | 105044965 A | 11/2015 |
| CN | 105334656 A | 2/2016 |
| CN | 205176432 U | 4/2016 |
| CN | 104948080 B | 6/2016 |
| CN | 205297172 U | 6/2016 |
| CN | 205558664 U | 9/2016 |
| CN | 206035269 U | 3/2017 |
| CN | 206352460 U | 7/2017 |
| CN | 107288492 A | 10/2017 |
| CN | 107327250 A | 11/2017 |
| CN | 206737720 U | 12/2017 |
| CN | 206801372 U | 12/2017 |
| CN | 206848627 U | 1/2018 |
| CN | 207004397 U | 2/2018 |
| EP | 978620 A2 | 2/2000 |
| EP | 2093051 A1 | 8/2009 |
| EP | 2256545 A1 | 12/2010 |
| EP | 2860580 A1 | 4/2015 |
| GB | 2546987 A | 8/2017 |
| JP | S62071930 A | 4/1987 |
| JP | H01202713 A | 8/1989 |
| JP | 2004182484 A | 7/2004 |
| JP | 2017068196 A | 4/2017 |
| KR | 20130037600 A | 4/2013 |
| WO | 2005084378 A2 | 9/2005 |
| WO | 2008090438 A2 | 7/2008 |
| WO | 2010100807 A1 | 9/2010 |
| WO | 2012111715 A1 | 8/2012 |
| WO | 2014032023 A1 | 2/2014 |
| WO | 2015059029 A1 | 4/2015 |
| WO | 2015100419 A1 | 7/2015 |
| WO | 2015117736 A1 | 8/2015 |
| WO | 2016008375 A1 | 1/2016 |
| WO | 2016043164 A1 | 3/2016 |
| WO | 2017008881 A1 | 1/2017 |
| WO | 2017011268 A1 | 1/2017 |
| WO | 2017183692 A1 | 10/2017 |
| WO | 2018086400 A1 | 5/2018 |

OTHER PUBLICATIONS

International Patent Application No. PCT/US2019/031538, International Search Report and Written Opinion dated Jun. 26, 2019, 19 pages.

* cited by examiner

ELECTRICALLY CONTROLLABLE PRIVACY GLAZING WITH ENERGY RECAPTURING DRIVER

RELATED MATTERS

This application claims the benefit of U.S. Provisional Patent Application No. 62/669,005, filed May 9, 2018, the entire content of which is incorporated herein by reference.

TECHNICAL FIELD

This disclosure relates to structures that include an electrically controllable optically active material and, more particularly, to drivers for controlling the electrically controllable optically active material.

BACKGROUND

Windows, doors, partitions, and other structures having controllable light modulation have been gaining popularity in the marketplace. These structures are commonly referred to as "smart" structures or "privacy" structures for their ability to transform from a transparent state in which a user can see through the structure to a private state in which viewing is inhibited through the structure. For example, smart windows are being used in high-end automobiles and homes and smart partitions are being used as walls in office spaces to provide controlled privacy and visual darkening.

A variety of different technologies can be used to provide controlled optical transmission for a smart structure. For example, electrochromic technologies, photochromic technologies, thermochromic technologies, suspended particle technologies, and liquid crystal technologies are all being used in different smart structure applications to provide controllable privacy. The technologies generally use an energy source, such as electricity, to transform from a transparent state to a privacy state or vice versa.

In practice, an electrical driver may be used to control or "drive" the optically active material. The driver may apply or cease applying electrical energy to the optically active material to transition between a transparent state and privacy state, or vice versa. In addition, the driver may apply an electrical signal to the optically active material once transitioned in a particular state to help maintain that state. For example, the driver may apply an electrical signal of alternating polarity to the optically active material to transition the optically active material between states and/or maintain the optically active material in a transitioned stated. When so configured, the process of changing the polarity of the structure from a first polarity to a second polarity may require discharging the structure from a voltage down to a zero voltage and then charging the structure from zero volts to an operating voltage at the opposite polarity. This consumes electrical energy impacting the overall energy efficiency of the structure.

SUMMARY

In general, this disclosure is directed to drivers for privacy structures incorporating an electrically controllable optically active material that provides controllable privacy. The privacy structures can be implemented in the form of a window, door, skylight, interior partition, or yet other structure where controllable visible transmittance is desired. In any case, the privacy structure may be fabricated from multiple panes of transparent material that include an electrically controllable medium between the panes. Each pane of transparent material can carry an electrode layer, which may be implemented as a layer of electrically conductive and optically transparent material deposited over the pane. The optically active material may be controlled, for example via an electrical driver communicatively coupled to the electrode layers, e.g., by controlling the application and/or removal of electrical energy to the optically active material. For example, the driver can control application and/or removal of electrical energy from the optically active material, thereby causing the optically active material to transition from a scattering state in which visibility through the structure is inhibited to a transparent state in which visibility through the structure is comparatively clear.

The electrical driver, which may also be referred to as a controller, may be designed to receive power from a power source, such as a rechargeable and/or replaceable battery and/or wall or mains power source. The electrical driver can condition the electricity received from the power source, e.g., by changing the frequency, amplitude, waveform, and/or other characteristic of the electricity received from the power source. The electrical driver can deliver the conditioned electrical signal to electrodes that are electrically coupled to the optically active material. In addition, in response to a user input or other control information, the electrical driver may change the conditioned electrical signal delivered to the electrodes and/or cease delivering electricity to the electrodes. Accordingly, the electrical driver can control the electrical signal delivered to the optically active material, thereby controlling the material to maintain a specific optical state or to transition from one state (e.g., a transparent state or scattering state) to another state.

In some configurations in accordance with the present disclosure, an electrical driver is configured to recapture energy released when changing the polarity of the electrically controllable optically active material, e.g., rather than discharging the released energy to ground. For example, the driver may include one or more energy storage elements. In operation, the driver may charge the electrically controllable optically active material to a first polarity or charge stage, for example in which a first electrode layer is functioning as an anode and a second electrode layer is functioning as a cathode. To alternate polarity, the driver may discharge the electrically controllable optically active material and subsequently recharge the electrically controllable optically active material to a second polarity or charge stage, for example in which the first electrode layer is functioning as the cathode and the second electrode layer is functioning as the anode.

To enhance the energy efficiency of the driver, the driver may store energy released from the electrically controllable optically active material during the discharging process in its one or more energy storage elements. The driver may subsequently use this stored energy, for example in addition to energy provided by a separate power source, to deliver electricity at an operating voltage to the electrically controllable optically active material that is at an opposite polarity to the polarity at which the electrically controllable optically active material was originally driven. In this way, the driver may recapture and reuse energy during polarity shifting, reduce the power requirements of the privacy structure.

In one example, an electrically dynamic window structure is described. The structure includes a first pane of transparent material, a second pane of transparent material, and an electrically controllable optically active material positioned between the first pane of transparent material and the second pane of transparent material. The electrically controllable optically active material is positioned between a first electrode layer and a second electrode layer. The structure also includes a driver electrically connected to the first electrode layer and the second electrode layer. In the example, the driver is electrically connected to a power source and configured to provide a drive signal to the first electrode layer and the second electrode layer for controlling the electrically controllable optically active material. The driver includes an energy storage element and is configured to: charge the electrically controllable optically active material to a first charge state, subsequently discharge the electrically controllable optically active material in a first discharge process, including storing energy in the energy storage element released from the electrically controllable optically active material during the first discharge process, and subsequently charge the electrically controllable optically active material to a second charge state, opposite the first charge state.

In another example, an electrical driver for driving an electrically dynamic window structure is described. The driver includes a power source and a switching network. The switching network includes first, second, third, and fourth switching mechanisms. The first switching mechanism is coupled between a first side of a privacy structure and ground, where the privacy structure includes an electrically controllable optically active material positioned between a first electrode carried by a first pane of transparent material and a second electrode carried by second pane of transparent material. The second switching mechanism is coupled between a second side of the privacy structure and ground. The third switching mechanism is coupled between the power source and the first side of the privacy structure. The fourth switching mechanism is coupled between the power source and the second side of the privacy structure. The example specifies that the switching network is arranged in an H-bridge configuration to provide bidirectional power to the privacy structure. The example driver also includes a first energy storage element and a second energy storage element. The second energy storage element is coupled between the first side of the privacy structure and the first and third switching mechanisms. The driver also includes a third energy storage element coupled between the second side of the privacy structure and the second and fourth switching mechanisms. In addition, the example driver includes a controller in communication with the switching network and configured to selectively switch the first, second, third, and fourth switching mechanisms such that energy is transferred from the power source to the electrically controllable optically active material to charge the electrically controllable optically active material in a first polarity, energy is transferred from the electrically controllable optically active material to the second energy storage element and/or the third energy storage element, and energy is transferred from the second energy storage element and/or the third energy storage element to the first energy storage element.

In another example, a method for providing electrical power to a privacy structure and recapturing energy to a first energy storage element from the privacy structure by adjusting a configuration of a switching network is described. The example method is performed with a switching network that includes a first switching mechanism, a second switching mechanism, a third switching mechanism, and a fourth switching mechanism arranged in an H-bridge configuration, where the privacy structure includes an electrically controllable optically active material positioned between a first electrode layer and a second electrode layer. The method includes closing the third switching mechanism and the second switching mechanism to cause current to flow from an energy source, through a second energy storage element, through the privacy structure in a first direction, and to a third energy storage element to energize the second and third energy storage elements and/or the privacy structure. The method further includes opening the third switching mechanism and closing the first switching mechanism to cause current to flow in a loop through the privacy structure in the first direction, the third energy storage element, and the second energy storage element such that energy is transferred from the second and third energy storage elements to the privacy structure. The method further involves eliminating the second current path by opening the first switching mechanism. The method also involves closing the first switching mechanism to cause current to flow through the privacy structure in a second direction opposite the first, the second energy storage element, and the third energy storage element such that energy is transferred from the privacy structure to the second and third energy storage elements. In addition, the method involves opening the first switching mechanism and closing the third switching mechanism to cause current to flow through the third energy storage element, through the privacy structure in the second direction, through the second energy storage element, and to the first energy storage element such that energy is transferred from the privacy structure, the second energy storage element, and/or the third energy storage element to the first energy storage element.

In another example, a method for providing electrical power to a privacy structure and recapturing energy to a first energy storage element from the privacy structure is described. The example method is performed on a privacy structure that includes an electrically controllable optically active material positioned between a first electrode layer and a second electrode layer. The method involves arranging a plurality of switching mechanisms into a first charging configuration such that a current flows in a first current path from a power source to the first electrode layer of the privacy structure in a first direction. The method further involves arranging the plurality of switching mechanisms into a second charging configuration, the second charging configuration creating a second current path including the privacy structure and a second energy storage element such that current flows through the privacy structure in the first direction. The method also involves arranging the plurality of switching mechanisms into a third charging configuration, the third charging configuration eliminating current flow paths to and from the privacy structure and maintaining the privacy structure in a first charged state. The method further includes arranging the plurality of switching mechanisms into a first discharging configuration such that current flows through the second energy storage element and the privacy structure in a second direction opposite the first direct. Further, the method includes arranging the plurality of switching mechanisms into a second discharging configuration such that current flows through the privacy structure in the second direction to the first energy storage element.

In another example, a driver for an electrically dynamic window structure is described. The driver includes a power source, a switching network comprising a plurality of switching elements, a first energy storage element, and a controller. The controller is configured to adjust the plurality of switching elements in order to: (a) charge the electrically dynamic window structure to a first charged state, (b) discharge the electrically dynamic window structure to a discharged state while storing energy discharged from the electrically dynamic window structure in the first energy storage element, (c) charge the electrically dynamic window structure to a first reverse charged state, the first reverse charged state being opposite the first charged state, (d) discharge the electrically dynamic window structure to the discharged state while storing energy discharged from the electrically dynamic window structure in the first energy storage element, and (e) repeat steps (a)-(d) at a predetermined frequency.

The details of one or more examples are set forth in the accompanying drawings and the description below. Other features, objects, and advantages will be apparent from the description and drawings, and from the claims.

DETAILED DESCRIPTION

Figure 1:
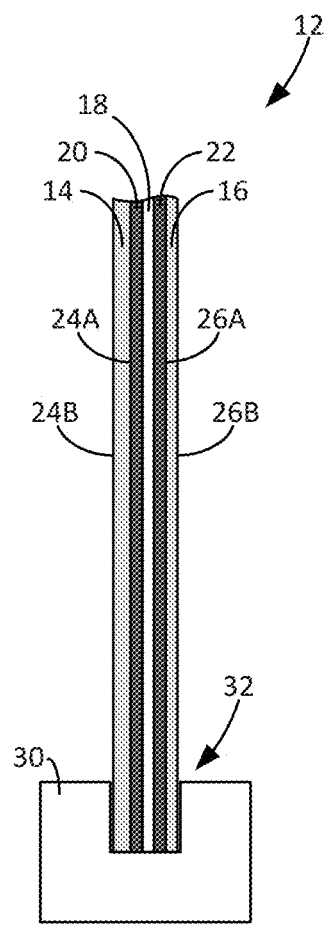
FIG. 1 is a side view of an example privacy glazing structure.

In general, the present disclosure is directed to electrical control systems, devices, and method for controlling optical structures having controllable light modulation. For example, an optical structure may include an electrically controllable optically active material that provides controlled transition between a privacy or scattering state and a visible or transmittance state. An electrical controller, or driver, may be electrically coupled to optically active material through electrode layers bounding the optically active material. The electrical driver may receive power from a power source and condition the electricity received from the power source, e.g., by changing the frequency, amplitude, waveform, and/or other characteristic of the electricity received from the power source. The electrical driver can deliver the conditioned electrical signal to the electrodes. In addition, in response to a user input or other control information, the electrical driver may change the conditioned electrical signal delivered to the electrodes and/or cease delivering electricity to the electrodes. Accordingly, the electrical driver can control the electrical signal delivered to the optically active material, thereby controlling the material to maintain a specific optical state or to transition from one state (e.g., a transparent state or scattering state) to another state.

As discussed in greater detail below, an electrical driver according to the disclosure may periodically switch the polarity of the electricity delivered to the privacy structure. When the electrically controllable optically active material is implemented as a liquid crystal material, this periodic polarity reversal can help prevent ions within the optically active material from preferentially migrating toward one electrode layer, which is a phenomenon sometimes referred to as ion plating. In some examples, the driver includes hardware and/or software for recovering and reutilizing energy released during polarity switching and/or transitioning between optical states. For example, the driver may include a plurality of switching mechanisms, each of which is configured to open and/or close during operation to establish different electrical charging and/or discharging pathways. The driver can also include an energy storage element. In operation, the driver can control the switching mechanisms to electrically couple and decouple the energy storage element to the electrically controllable optically active material. Accordingly, the energy storage element can capture and store energy released when the electrically controllable optically active material is discharging and subsequently deliver the stored electrical energy back to the optically active material during subsequent charging.

Example electrical driver configurations and electrical control features are described in greater detail with FIGS. 3-10. However, FIGS. 1 and 2 first describe example privacy structures that may utilize an electrical driver arrangement and electrical control features as described herein.

FIG. 1 is a side view of an example privacy glazing structure 12 that includes a first pane of transparent material 14 and a second pane of transparent material 16 with a layer of optically active material 18 bounded between the two panes of transparent material. The privacy glazing structure 12 also includes a first electrode layer 20 and a second electrode layer 22. The first electrode layer 20 is carried by the first pane of transparent material 14 while the second electrode layer 22 is carried by the second pane of transparent material. In operation, electricity supplied through the first and second electrode layers 20, 22 can control the optically active material 18 to control visibility through the privacy glazing structure.

Privacy glazing structure 12 can utilize any suitable privacy materials for the layer of optically active material 18. Further, although optically active material 18 is generally illustrated and described as being a single layer of material, it should be appreciated that a structure in accordance with the disclosure can have one or more layers of optically active material with the same or varying thicknesses. In general, optically active material 18 is configured to provide controllable and reversible optical obscuring and lightening. Optically active material 18 can be an electronically controllable optically active material that changes direct visible transmittance in response to changes in electrical energy applied to the material.

In one example, optically active material 18 is formed of an electrochromic material that changes opacity and, hence, light transmission properties, in response to voltage changes applied to the material. Typical examples of electrochromic materials are $WO_3$ and $MoO_3$, which are usually colorless when applied to a substrate in thin layers. An electrochromic layer may change its optical properties by oxidation or reduction processes. For example, in the case of tungsten oxide, protons can move in the electrochromic layer in response to changing voltage, reducing the tungsten oxide to blue tungsten bronze. The intensity of coloration is varied by the magnitude of charge applied to the layer.

In another example, optically active material 18 is formed of a liquid crystal material. Different types of liquid crystal materials that can be used as optically active material 18 include polymer dispersed liquid crystal (PDLC) materials and polymer stabilized cholesteric texture (PSCT) materials. Polymer dispersed liquid crystals usually involve phase separation of nematic liquid crystal from a homogeneous liquid crystal containing an amount of polymer, sandwiched between electrode layers 20 and 22. When the electric field is off, the liquid crystals may be randomly scattered. This scatters light entering the liquid crystal and diffuses the transmitted light through the material. When a certain voltage is applied between the two electrode layers, the liquid crystals may homeotropically align and the liquid crystals increase in optical transparency, allowing light to transmit through the crystals.

In the case of polymer stabilized cholesteric texture (PSCT) materials, the material can either be a normal mode polymer stabilized cholesteric texture material or a reverse mode polymer stabilized cholesteric texture material. In a normal polymer stabilized cholesteric texture material, light is scattered when there is no electrical field applied to the material. If an electric field is applied to the liquid crystal, it turns to the homeotropic state, causing the liquid crystals to reorient themselves parallel in the direction of the electric field. This causes the liquid crystals to increase in optical transparency and allows light to transmit through the liquid crystal layer. In a reverse mode polymer stabilized cholesteric texture material, the liquid crystals are transparent in the absence of an electric field (e.g., zero electric field) but opaque and scattering upon application of an electric field.

In one example in which the layer of optically active material 18 is implemented using liquid crystals, the optically active material includes liquid crystals and a dichroic dye to provide a guest-host liquid crystal mode of operation. When so configured, the dichroic dye can function as a guest compound within the liquid crystal host. The dichroic dye can be selected so the orientation of the dye molecules follows the orientation of the liquid crystal molecules. In some examples, when an electric field is applied to the optically active material 18, there is little to no absorption in the short axis of the dye molecule, and when the electric field is removed from the optically active material, the dye molecules absorb in the long axis. As a result, the dichroic dye molecules can absorb light when the optically active material is transitioned to a scattering state. When so configured, the optically active material may absorb light impinging upon the material to prevent an observer on one side of privacy glazing structure 12 from clearly observing activity occurring on the opposite side of the structure.

When optically active material 18 is implemented using liquid crystals, the optically active material may include liquid crystal molecules within a polymer matrix. The polymer matrix may or may not be cured, resulting in a solid or liquid medium of polymer surrounding liquid crystal molecules. In addition, in some examples, the optically active material 18 may contain spacer beads (e.g., micro-spheres), for example having an average diameter ranging from 3 micrometers to 40 micrometers, to maintain separation between the first pane of transparent material 14 and the second pane of transparent material 16.

In another example in which the layer of optically active material 18 is implemented using a liquid crystal material, the liquid crystal material turns hazy when transitioned to the privacy state. Such a material may scatter light impinging upon the material to prevent an observer on one side of privacy glazing structure 12 from clearly observing activity occurring on the opposite side of the structure. Such a material may significantly reduce regular visible transmittance through the material (which may also be referred to as direct visible transmittance) while only minimally reducing total visible transmittance when in the privacy state, as compared to when in the light transmitting state. When using these materials, the amount of scattered visible light transmitting through the material may increase in the privacy state as compared to the light transmitting state, compensating for the reduced regular visible transmittance through the material. Regular or direct visible transmittance may be considered the transmitted visible light that is not scattered or redirected through optically active material 18.

Another type of material that can be used as the layer of optically active material 18 is a suspended particle material. Suspended particle materials are typically dark or opaque in a non-activated state but become transparent when a voltage is applied. Other types of electrically controllable optically active materials can be utilized as optically active material 18, and the disclosure is not limited in this respect.

Independent of the specific type of material(s) used for the layer of optically active material 18, the material can change from a light transmissive state in which privacy glazing structure 12 is intended to be transparent to a privacy state in which visibility through the insulating glazing unit is intended to be blocked. Optically active material 18 may exhibit progressively decreasing direct visible transmittance when transitioning from a maximum light transmissive state to a maximum privacy state. Similarly, optically active material 18 may exhibit progressively increasing direct visible transmittance when transitioning from a maximum privacy state to a maximum transmissive state. The speed at which optically active material 18 transitions from a generally transparent transmission state to a generally opaque privacy state may be dictated by a variety of factors, including the specific type of material selected for optically active material 18, the temperature of the material, the electrical voltage applied to the material, and the like.

To electrically control optically active material 18, privacy glazing structure 12 in the example of FIG. 1 includes first electrode layer 20 and second electrode layer 22. Each electrode layer may be in the form of an electrically conductive coating deposited on or over the surface of each respective pane facing the optically active material 18. For example, first pane of transparent material 14 may define an inner surface 24A and an outer surface 24B on an opposite side of the pane. Similarly, second pane of transparent material 16 may define an inner surface 26A and an outer surface 26B on an opposite side of the pane. First electrode layer 20 can be deposited over the inner surface 24A of the first pane, while second electrode layer 22 can be deposited over the inner surface 26A of the second pane. The first and second electrode layers 20, 22 can be deposited directly on the inner surface of a respective pane or one or more intermediate layers, such as a blocker layer, and be deposited between the inner surface of the pane and the electrode layer.

Each electrode layer 20, 22 may be an electrically conductive coating that is a transparent conductive oxide ("TCO") coating, such as aluminum-doped zinc oxide and/ or tin-doped indium oxide. In some examples, the transparent conductive coatings forming electrode layers 20, 22 define wall surfaces of a cavity between first pane of transparent material 14 and second pane of transparent material 16 which optically active material 18 contacts. In other examples, one or more other coatings may overlay the first and/or second electrode layers 20, 22, such as a dielectric overcoat (e.g., silicon oxynitride). In either case, first pane of transparent material 14 and second pane of transparent material 16, as well as any coatings on inner faces 24A, 26A of the panes can form a cavity or chamber containing optically active material 18.

The panes of transparent material forming privacy glazing structure 12, including first pane 14 and second pane 16, and be formed of any suitable material. Each pane of transparent material may be formed from the same material, or at least one of the panes of transparent material may be formed of a material different than at least one other of the panes of transparent material. In some examples, at least one (and optionally all) the panes of privacy glazing structure 12 are formed of glass. In other examples, at least one (and optionally all) the privacy glazing structure 12 are formed of plastic such as, e.g., a fluorocarbon plastic, polypropylene, polyethylene, or polyester. When glass is used, the glass may be aluminum borosilicate glass, sodium-lime (e.g., sodium-lime-silicate) glass, or another type of glass. In addition, the glass may be clear or the glass may be colored, depending on the application. Although the glass can be manufactured using different techniques, in some examples the glass is manufactured on a float bath line in which molten glass is deposited on a bath of molten tin to shape and solidify the glass. Such an example glass may be referred to as float glass.

In some examples, first pane 14 and/or second pane 16 may be formed from multiple different types of materials. For example, the substrates may be formed of a laminated glass, which may include two panes of glass bonded together with a polymer such as polyvinyl butyral. Additional details on privacy glazing substrate arrangements that can be used in the present disclosure can be found in US Patent Publication No. 2018/0307111, titled "HIGH PERFORMANCE PRIVACY GLAZING STRUCTURES" and published Oct. 25, 2018, the entire contents of which are incorporated herein by reference.

Privacy glazing structure 12 can be used in any desired application, including in a door, a window, a wall (e.g., wall partition), a skylight in a residential or commercial building, or in other applications. To help facilitate installation of privacy glazing structure 12, the structure may include a frame 30 surrounding the exterior perimeter of the structure. In different examples, frame 30 may be fabricated from wood, metal, or a plastic material such a vinyl. Frame 30 may defines a channel 32 that receives and holds the external perimeter edge of structure 12. The sightline through privacy glazing structure 12 is generally established as the location where frame 30 end and visibility through privacy glazing structure 12 begins.

Figure 2:
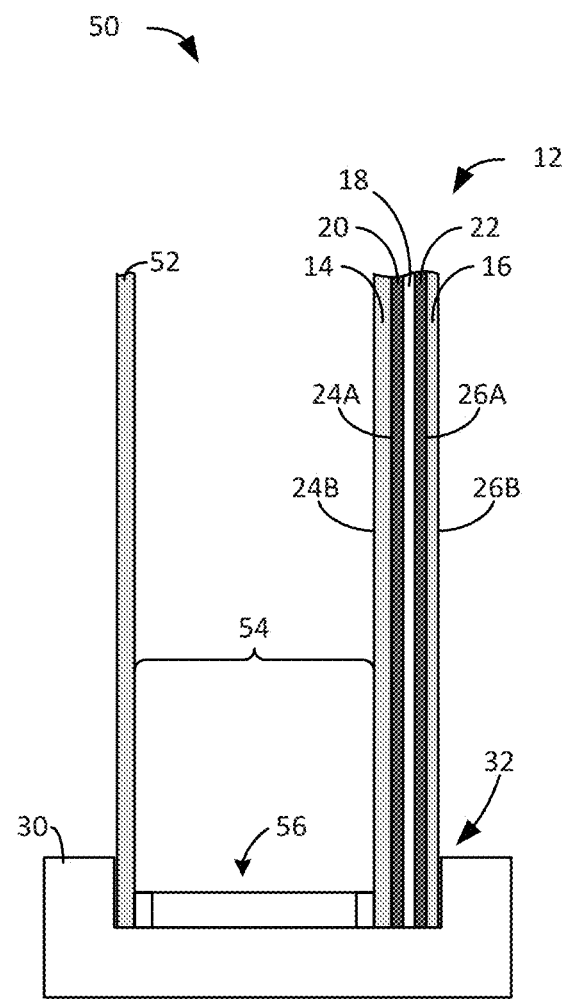
FIG. 2 is a side view of the example privacy glazing structure of FIG. 1 incorporated into a multi-pane insulating glazing unit.

In the example of FIG. 1, privacy glazing structure 12 is illustrated as a privacy cell formed of two panes of transparent material bounding optically active material 18. In other configurations, privacy glazing structure 12 may be incorporated into a multi-pane glazing structure that include a privacy cell having one or more additional panes separated by one or more between-pane spaces. FIG. 2 is a side view of an example configuration in which privacy glazing structure 12 from FIG. 1 is incorporated into a multi-pane insulating glazing unit having a between-pane space.

As shown in the illustrated example of FIG. 2, a multi-pane privacy glazing structure 50 may include privacy glazing structure 12 separated from an additional (e.g., third) pane of transparent material 52 by a between-pane space 54, for example, by a spacer 56. Spacer 56 may extend around the entire perimeter of multi-pane privacy glazing structure 50 to hermetically seal the between-pane space 54 from gas exchange with a surrounding environment. To minimize thermal exchange across multi-pane privacy glazing structure 50, between-pane space 54 can be filled with an insulative gas or even evacuated of gas. For example, between-pane space 54 may be filled with an insulative gas such as argon, krypton, or xenon. In such applications, the insulative gas may be mixed with dry air to provide a desired ratio of air to insulative gas, such as 10 percent air and 90 percent insulative gas. In other examples, between-pane space 54 may be evacuated so that the between-pane space is at vacuum pressure relative to the pressure of an environment surrounding multi-pane privacy glazing structure 50.

Spacer 56 can be any structure that holds opposed substrates in a spaced apart relationship over the service life of multi-pane privacy glazing structure 50 and seals between-pane space 54 between the opposed panes of material, e.g., so as to inhibit or eliminate gas exchange between the between-pane space and an environment surrounding the unit. One example of a spacer that can be used as spacer 56 is a tubular spacer positioned between first pane of transparent material 14 and third pane of transparent material 52. The tubular spacer may define a hollow lumen or tube which, in some examples, is filled with desiccant. The tubular spacer may have a first side surface adhered (by a first bead of sealant) to the outer surface 24B of first pane of transparent material 14 and a second side surface adhered (by a second bead of sealant) to third pane of transparent material 52. A top surface of the tubular spacer can be exposed to between-pane space 54 and, in some examples, includes openings that allow gas within the between-pane space to communicate with desiccating material inside of the spacer. Such a spacer can be fabricated from aluminum, stainless steel, a thermoplastic, or any other suitable material.

Another example of a spacer that can be used as spacer 56 is a spacer formed from a corrugated metal reinforcing sheet surrounded by a sealant composition. The corrugated metal reinforcing sheet may be a rigid structural component that holds first pane of transparent material 14 apart from third pane of transparent material 52. In yet another example, spacer 56 may be formed from a foam material surrounded on all sides except a side facing a between-pane space with a metal foil. As another example, spacer 56 may be a thermoplastic spacer (TPS) spacer formed by positioning a primary sealant (e.g., adhesive) between first pane of transparent material 14 and third pane of transparent material 52 followed, optionally, by a secondary sealant applied around the perimeter defined between the substrates and the primary sealant. Spacer 56 can have other configurations, as will be appreciated by those of ordinary skill in the art.

Depending on the application, first patent of transparent material 14, second pane of transparent material 16, and/or third pane of transparent material 52 (when included) may be coated with one or more functional coatings to modify the performance of privacy structure. Example functional coatings include, but are not limited to, low-emissivity coatings, solar control coatings, and photocatalytic coatings. In general, a low-emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include a conductive metal like silver, gold, or copper. A photocatalytic coating, by contrast, may be a coating that includes a photocatalyst, such as titanium dioxide. In use, the photocatalyst may exhibit photoactivity that can help self-clean, or provide less maintenance for, the panes.

The electrode layers 20, 22 of privacy glazing structure 12, whether implemented alone or in the form of a multiple-pane structure with a between-pane space, can be electrically connected to a driver. The driver can provide power and/or control signals to control optically active material 18. In some configurations, wiring is used to establish electrical connection between the driver and each respective electrode layer. A first wire can provide electrical communication between the driver and the first electrode layer 20 and a second wire can provide electrical communication between the driver and the second electrode layer 22. In general, the term wiring refers to any flexible electrical conductor, such as a thread of metal optionally covered with an insulative coating, a flexible printed circuit, a bus bar, or other electrical connector facilitating electrical connection to the electrode layers.

Figure 3:
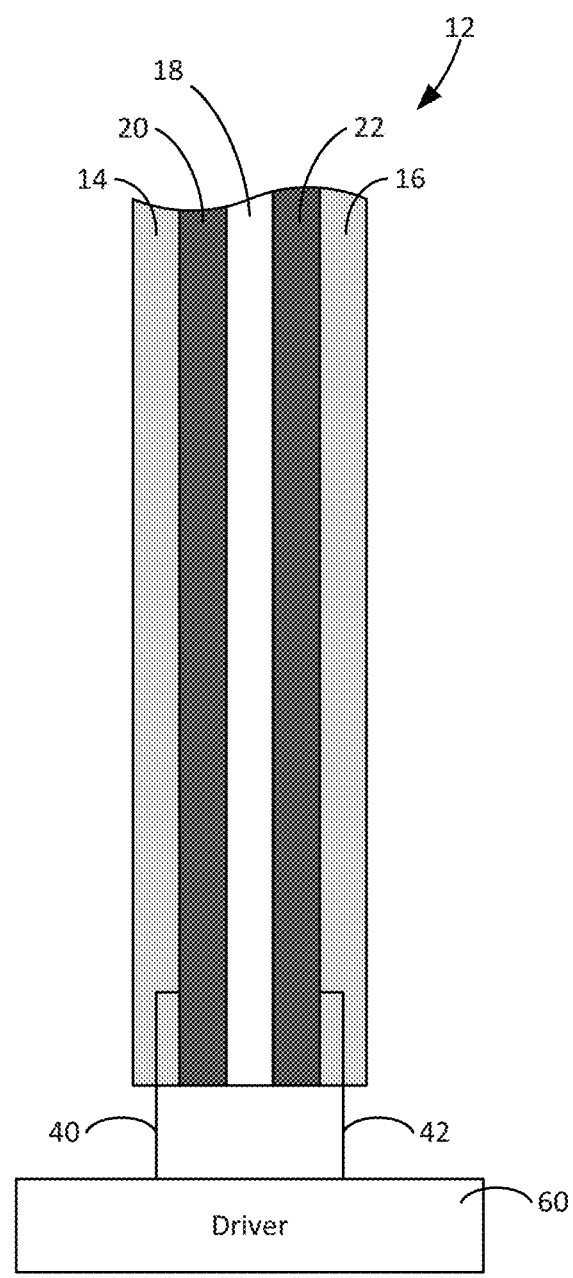
FIG. 3 is an exemplary schematic illustration showing an example connection arrangement of a driver to electrode layers of a privacy structure.

FIG. 3 is a schematic illustration showing an example connection arrangement between a driver and electrode layers of a privacy structure. In the illustrated example, wires 40 and 42 electrically couple driver 60 to the first electrode layer 20 and the second electrode layer 22, respectively. In some examples, wire 40 and/or wire 42 may connect to their respective electrode layers via a conduit or hole in the transparent pane adjacent the electrode layer. In other configurations, wire 40 and/or wire 42 may contact their respective electrode layers at the edge of the privacy structure 12 without requiring wire 40 and/or wire 42 to extend through other sections (e.g., transparent panes 14, 16) to reach the respective electrode layer(s). In either case, driver 60 may be electrically coupled to each of electrode layers 20 and 22.

In operation, the driver 60 can apply a voltage difference between electrode layers 20 and 22, resulting in an electric field across optically active material 18. The optical properties of the optically active material 18 can be adjusted by applying and/or adjusting the voltage across the layer. In some embodiments, the effect of the voltage on the optically active material 18 is independent on the polarity of the applied voltage. For example, in some examples in which optically active material 18 comprises liquid crystals that align with an electric field between electrode layers 20 and 22, the optical result of the crystal alignment is independent of the polarity of the electric field. For instance, liquid crystals may align with an electric field in a first polarity, and may rotate approximately 180° in the event the polarity if reversed. However, the optical state of the liquid crystals (e.g., the opacity) in either orientation may be approximately the same.

Figure 4:
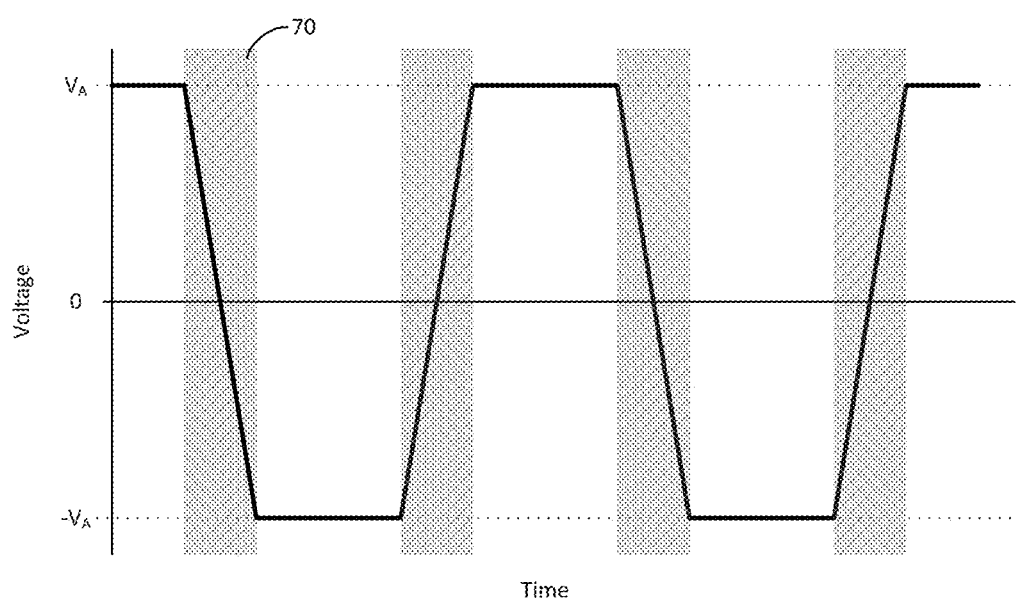
FIG. 4 shows an exemplary driver signal applied between a first electrode layer and a second electrode layer over time.

FIG. 4 shows an example alternating current drive signal that may be applied between first electrode layer 20 and second electrode layer 22 over time. It will be appreciated that the signal of FIG. 4 is exemplary and is used for illustrative purposes, and that any variety of signals applied from the driver may be used. In the example of FIG. 4, a voltage signal between the first electrode layer and the second electrode layer produced by the driver varies over time between applied voltages $V_A$ and $-V_A$. In other words, in the illustrated example, a voltage of magnitude $V_A$ is applied between the first and second electrode layers, and the polarity of the applied voltage switches back and forth over time. The optical state (e.g., either transparent or opaque) of optically active material 18 may be substantially unchanging while the voltage is applied to the optically active layer even though the voltage applied to the layer is varying over time. The optical state may be substantially unchanging in that the unaided human eye may not detect changes to optically active material 18 in response to the alternating polarity of the current. However, optically active material 18 may change state (e.g., from transparent to opaque) if the driver stops delivering power to the optically active layer.

As shown in the example of FIG. 4, the voltage does not immediately reverse polarity from $V_A$ to $-V_A$. Instead, the voltage changes polarity over a transition time 70 (shaded). In some examples, a sufficiently long transition time may result in an observable transition of the optically active material from between polarities. For instance, in an exemplary embodiment, liquid crystals in an optically active material may align with an electric field to create a substantially transparent structure, and become substantially opaque when the electric field is removed. Thus, when transitioning from $V_A$ (transparent) to $-V_A$ (transparent), a slow enough transition between $V_A$ and $-V_A$ may result in an observable optical state (e.g., opaque or partially opaque) when $-V_A < V < V_A$ (e.g., when $|V| << V_A$). On the other hand a fast enough transition between polarities (e.g., from $V_A$ to $-V_A$) may appear to an observer (e.g., to the naked eye in real time) to result in no apparent change in the optical state of the optically active material.

In some examples, if a particular optical state (e.g., a transparent state) is to be maintained, switching between polarities that each correspond to that optical state (e.g., between $+V_A$ and $-V_A$) can prevent damage to the optically active material. For example, in some cases, a static or direct current voltage applied to an optically active material can result in ion plating within the structure, causing optical defects in the structure. To avoid this optical deterioration, a driver for an optically active material (e.g., in an electrically dynamic window such as a privacy structure) can be configured to continuously switch between applied polarities of an applied voltage (e.g. $V_A$) in order to maintain the desired optical state.

Figure 5A:
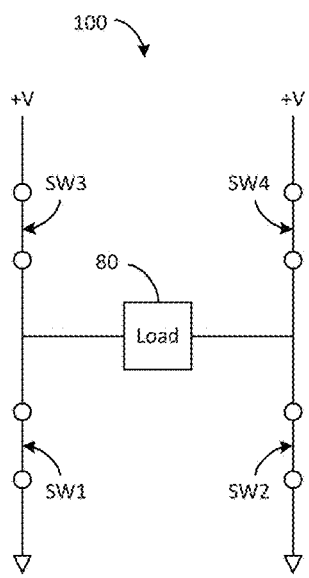
FIGS. 5A-5C illustrate an example switching network in the form of an H-bridge configuration for applying a reversible polarity voltage to a load.
Figure 5B:
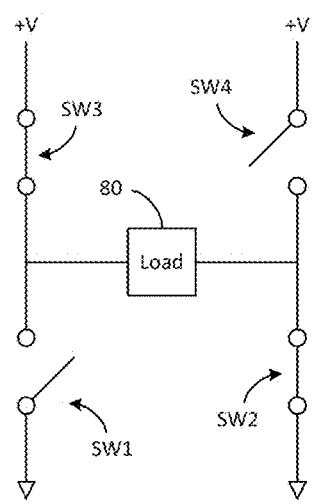
Figure 5C:
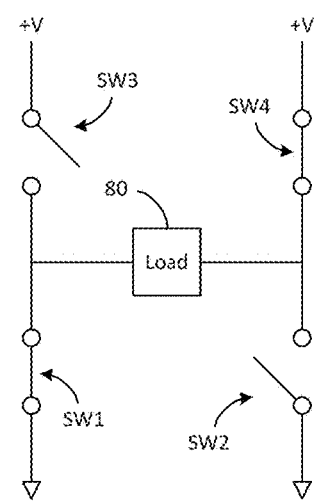

One technique for applying a voltage of opposite polarities to a load (e.g., an optically active material) is via a switching network, such as an H-bridge configuration. FIGS. 5A-5C illustrate an example switching network in the form of an H-bridge configuration for applying a reversible polarity voltage to a load. As shown, the switching network 100 includes four switches, SW1, SW2, SW3, and SW4, arranged among a voltage source +V, a load 80, and ground.

FIG. 5A shows a general H-bridge configuration where switches SW1, SW2, SW3, and SW4 are all in a closed state. In the example of FIG. 5B, switch SW3 and SW2 are closed, while switches SW4 and SW1 are open, placing voltage +V on the left side of load 80 and ground on the right side of load 80. FIG. 5C shows another switching configuration, where switches SW4 and SW1 are closed and switches SW2 and SW3 are open, placing voltage +V on the right side of load 80 and ground on the left side of load 80. Thus, a voltage V is applied across the load 80 in one polarity in the configuration of FIG. 5B, and in an opposite polarity in the configuration of FIG. 5C.

In a traditional H-bridge switching network, repeatedly applying a voltage in one polarity to a load and then applying an opposite voltage to the load can be inefficient. For instance, with respect to a capacitive load, applying a voltage in a first polarity can charge the capacitive load to the first voltage. However, applying the voltage in the second polarity requires first discharging the capacitive load from the first voltage to zero volts, and then charging the capacitive load to the first voltage in the opposite direction. This results in a loss of energy during each polarity reversal.

Figure 6:
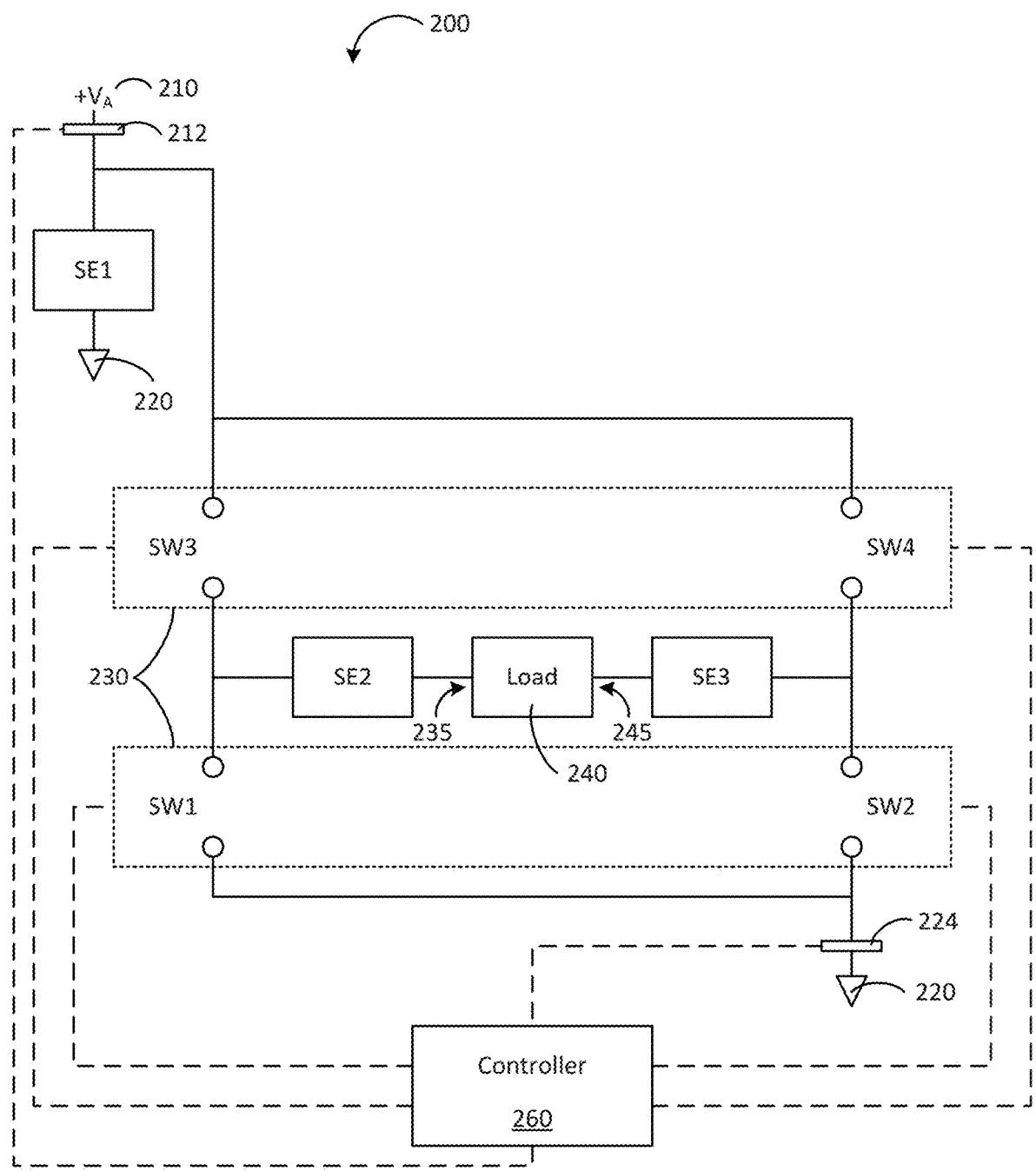
FIG. 6 shows an exemplary driver configuration including a switching network and a plurality of energy storage devices in communication therewith.

In accordance with some examples of the present disclosure, a driver may include one or more energy storage elements combined with a switching network to capture the energy lost from the load, for example, as the load discharges in order to apply a reverse polarity voltage to the load. FIG. 6 shows an example driver configuration including a switching network and a plurality of energy storage devices in communication with the switching network. In the illustrated example, driver 200 includes a power source 210 shown as applying a voltage $V_A$, a ground 220, and a switching network 230 used to drive load 240, for example, in opposing polarities. Switching network 230 can include one or more switching mechanisms capable of selectively electrically connecting and disconnecting components on either side of the switching mechanism. In various embodiments, switching mechanisms can include transistors, such as metal-oxide-semiconductor field-effect transistors (MOSFETs) or the like. Power source 210 may be a direct current power source (e.g., battery), an alternating current power source (e.g., wall or mains power) or other suitable power source. The drive load 240 may be electrically controllable optically active material 18 along with first and second electrode layers 20, 22.

In the example of FIG. 6, switching network 230 includes a first switching mechanism SW1 coupled between a first side 235 of a load 240 and ground 220 and a second switching mechanism SW2 coupled between a second side 245 of the load 240 and ground 220. In some examples, an isolating component 224 can selectively prevent or permit current flow from switching mechanisms SW1, SW2 to ground 220. Switching network 230 further includes a third switching mechanism SW3 coupled between the first side 235 of the load 240 and the power source 210 and a fourth switching mechanism SW4 coupled between the second side 245 of the load 240 and the power source 210. It will be appreciated that, as used herein, being "coupled to" or "coupled between" components implies at least indirect electrical connection. However, unless otherwise stated, the terms "coupled to" or "coupled between" does not require that the "coupled" components be directly connected to one another.

The driver 200 of FIG. 6 includes first energy storage element SE1, which is shown as being in electrical communication with the third and fourth switching mechanisms, SW3 and SW4, respectively and power source 210 on a first side, and ground 220 on another side. Isolating component 212 is shown as being positioned to selectively enable or disable current flow between the power source 210 and other components of the driver 200, such as the first energy storage element SE1 or the third and fourth switching mechanisms.

The driver 200 further includes a second energy storage element SE2 coupled to the first side 235 of the load 240 and being coupled between the third switching mechanism SW3 and the first switching mechanism SW1. Similarly, the driver includes a third energy storage element SE3 coupled to the second side 245 of the load 240 and being coupled between the fourth switching mechanism SW4 and the second switching mechanism SW2.

In various embodiments, energy storage elements can be electrical energy storage elements, such as inductive storage elements, capacitive storage elements, one or more batteries, or the like. In some examples, storage elements SE1, SE2, and SE3 are the same. In other examples, at least one of SE1, SE2, and SE3 is different from the others. In some embodiments, SE1 comprises a capacitive energy storage element and SE2 and SE3 comprise inductive energy storage elements. In some such embodiments, SE2 and SE3 comprise matched inductive energy storage elements.

The driver 200 in FIG. 6 further includes a controller 260 in communication with the switching network 230. In the illustrated example, controller 260 is in communication with each of the switching mechanisms (SW1, SW2, SW3, SW4). Controller 260 can be configured to control switching operation of the switching mechanisms, for example, by opening and closing switching mechanisms to selectively electrically connect or disconnect components on either side of each of the switching mechanisms. In various embodiments, controller 260 can be configured to control switching mechanisms in series and/or in parallel (e.g., simultaneous switching).

In some examples, the controller 260 is configured to control the switching mechanisms in order to provide a voltage (e.g., from power source 210) to load 240, such as an optically active material in an electrically dynamic window. Further, in some embodiments, the controller 260 can be configured to control the switching mechanisms in order to periodically change the polarity of the voltage applied to the load 240. In some such examples, operation of the switching network can be performed so that at least some of the energy discharged from the load (e.g., when changing polarities) can be recovered and stored in one or more energy storage elements SE1, SE2, SE3. Such recovered and stored energy can be used, for example, to perform subsequent charging operations.

As described, in some embodiments, driver 200 further includes additional components for selectively preventing current flow to various portions of the driver. For instance, in the illustrated embodiment of FIG. 6, driver 200 includes isolating component 212 configured to selectively permit current flow between power source 210 and other portions of the driver. Similarly, driver 200 includes isolating component 224 configured to selectively permit current flow between ground 220 and other portions of the driver 200. In some examples, isolating components 212, 224 can be controlled via the controller 260 during various phases of driver operation. Isolating components can include any of a variety of suitable components for selectively permitting and/or preventing current flow between various driver components. For example, in various embodiments, isolating components 212, 224 can include switches, transistors (e.g., power MOSFETs), or other components or combinations thereof.

FIGS. 7-10 illustrate a variety of switching network configurations and transitions that can be used to apply a voltage alternatingly in a first polarity and an opposite polarity to a load using a switching network and driver configuration such as shown in FIG. 6.

Exemplary Charging Process

Figure 7A:
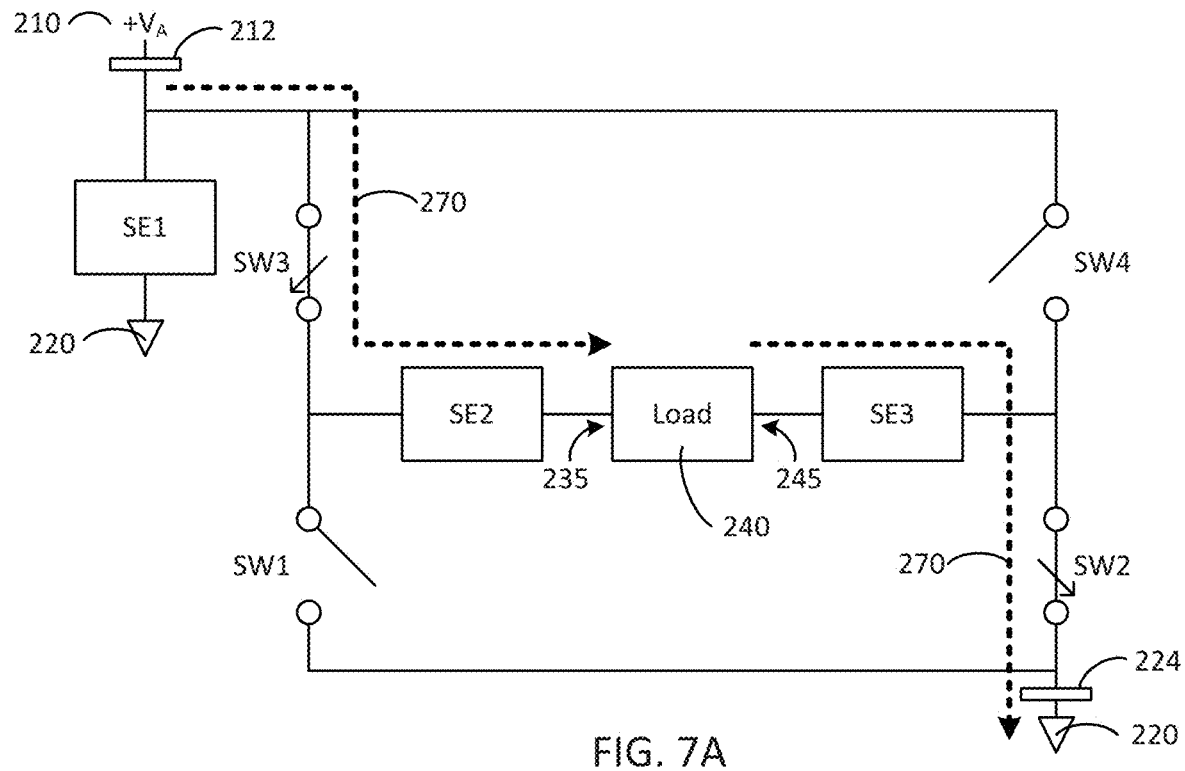
FIGS. 7A-7D illustrate an exemplary charging process for charging a load via a driver such as shown in FIG. 6.

FIGS. 7A-7D illustrate an exemplary charging process for charging a load via a driver such as shown in FIG. 6. FIG. 7A shows a first step of the charging process. In the first step, the third switching mechanism SW3 and the second switching mechanism SW2 are closed, while the first switching mechanism SW1 and the fourth switching mechanism SW4 are open. This creates a current path 270 from power source 210 and/or first energy storage element SE1 through the third switching mechanism SW3, the second energy storage element SE2, the load 240, the third energy storage element SE3, the second switching mechanism SW2 to ground 220. In this example, current flows in a first direction through the load 240 (from the first side 235 toward second side 245). In some examples, for instance, in the case of a capacitive load, the load 240 charges in a first polarity. In some examples, during this step, energy stored in SE1 contributes to the charging process, and storage elements SE2 and SE3 become charged.

Figure 7B:
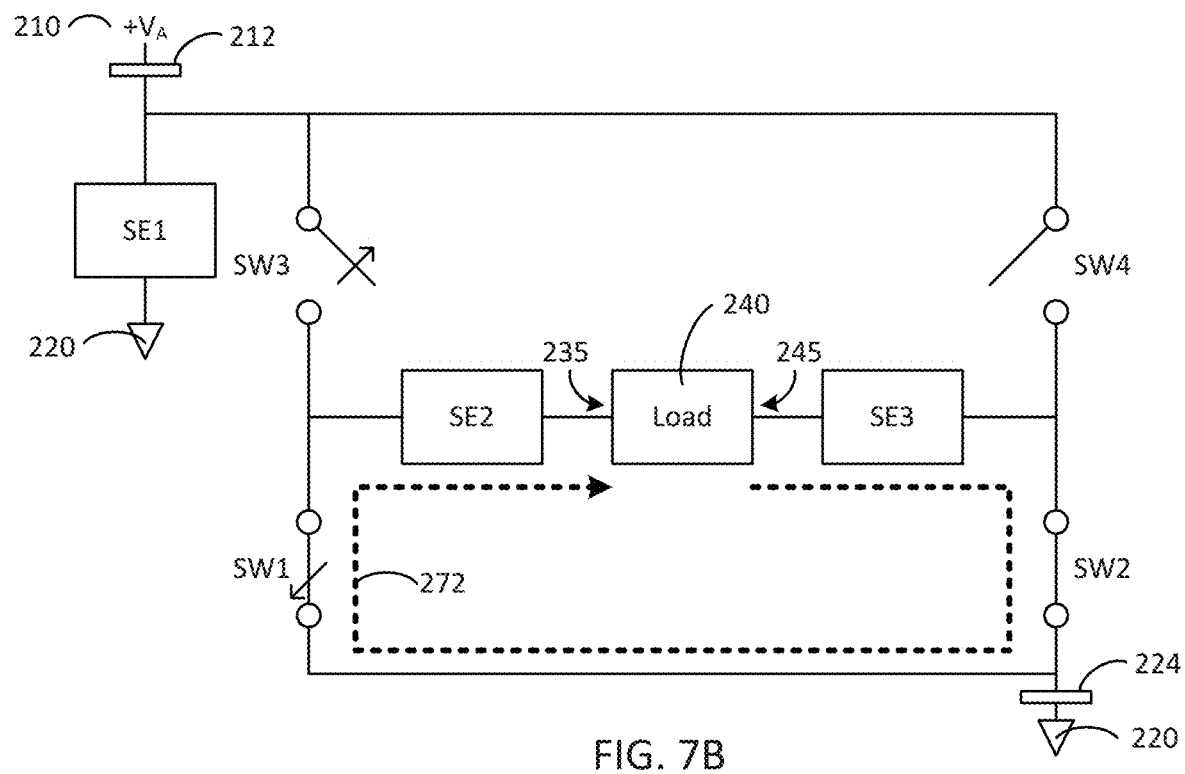

FIG. 7B shows a second step in the charging process. In the second step (relative to the configuration shown in the first step), the third switching mechanism SW3 is opened and the first switching mechanism SW1 is closed. This creates a current path 272 including the load 240, the third energy storage element SE3, the second switching mechanism SW2, the first switching mechanism SW1, and the second energy storage element SE2. In some embodiments, isolating component 224 prevents current from leaking to ground 220.

In some examples, during the second step, current temporarily continues to flow in the first direction, charging the load 240, due to the behavior of the load 240 and/or the discharge of stored energy from one or both of the second energy storage element SE2 and the third energy storage element SE3. For instance, in an exemplary embodiment, second energy storage element SE2 and the third energy storage element SE3 comprise matched inductors, which are energized by the current flowing therethrough in step one shown in FIG. 7A. The energized inductors discharge the energy stored therein, causing current to continue to flow through the load via current path 272 when the second step shown in FIG. 7B is performed.

Figure 7C:
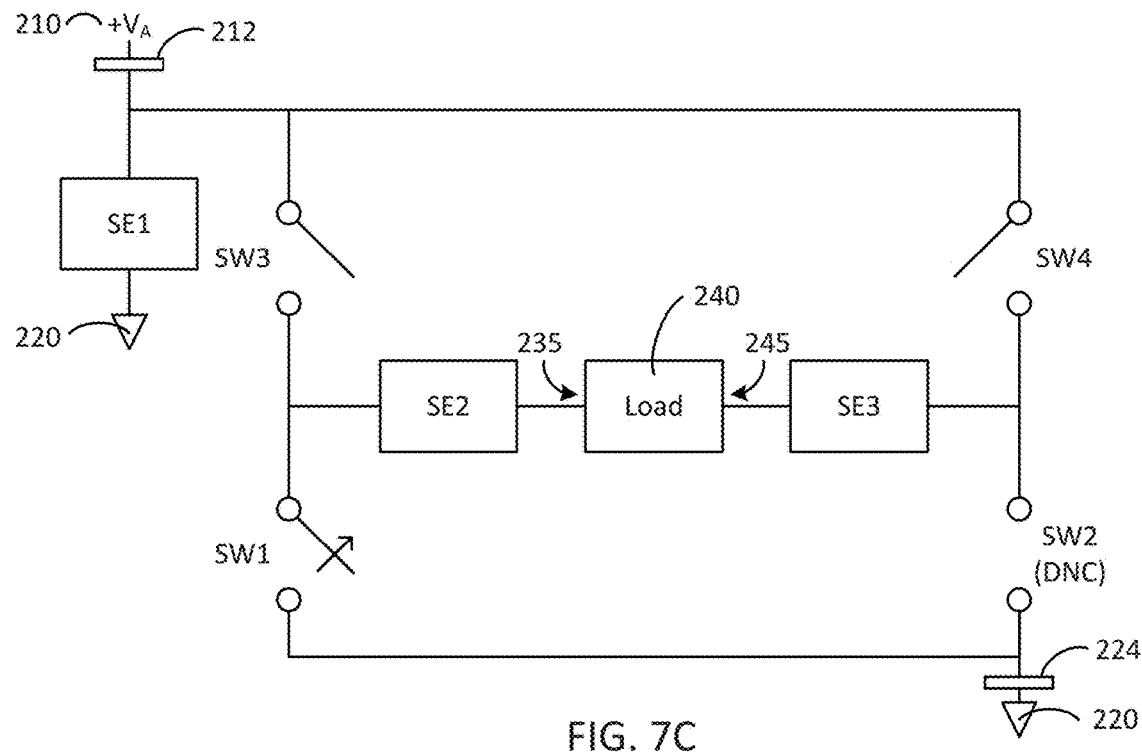

FIG. 7C shows a third step in the charging process. In the illustrated example, the first switching mechanism SW1 is opened, eliminating any current loops containing the load 240. In some such examples, second switching mechanism SW2 is also opened, however, in alternate embodiments, second switching mechanism SW2 can remain closed. In still further alternative embodiments, second switching mechanism SW2 could be opened and first switching mechanism SW1 could be either open or closed. In some embodiments, with respect to the illustrated embodiment, the first switching mechanism SW1 is opened at or approximately at the moment that the second energy storage element SE2 and the third energy storage element SE3 have discharged their energy and before the current path 272 described with respect to FIG. 7B results in energy being dissipated from load 240. In some examples, this timing can be controlled by a system controller, and can be determined based on, for example, various values associated with the driver, such as the voltage of the power source 210, inductance values of energy storage elements, capacitance values of the load 240, or the like. Eliminating current paths as illustrated in FIG. 7C maintains the charge level of load 240 at an approximately constant value.

Figure 7D:
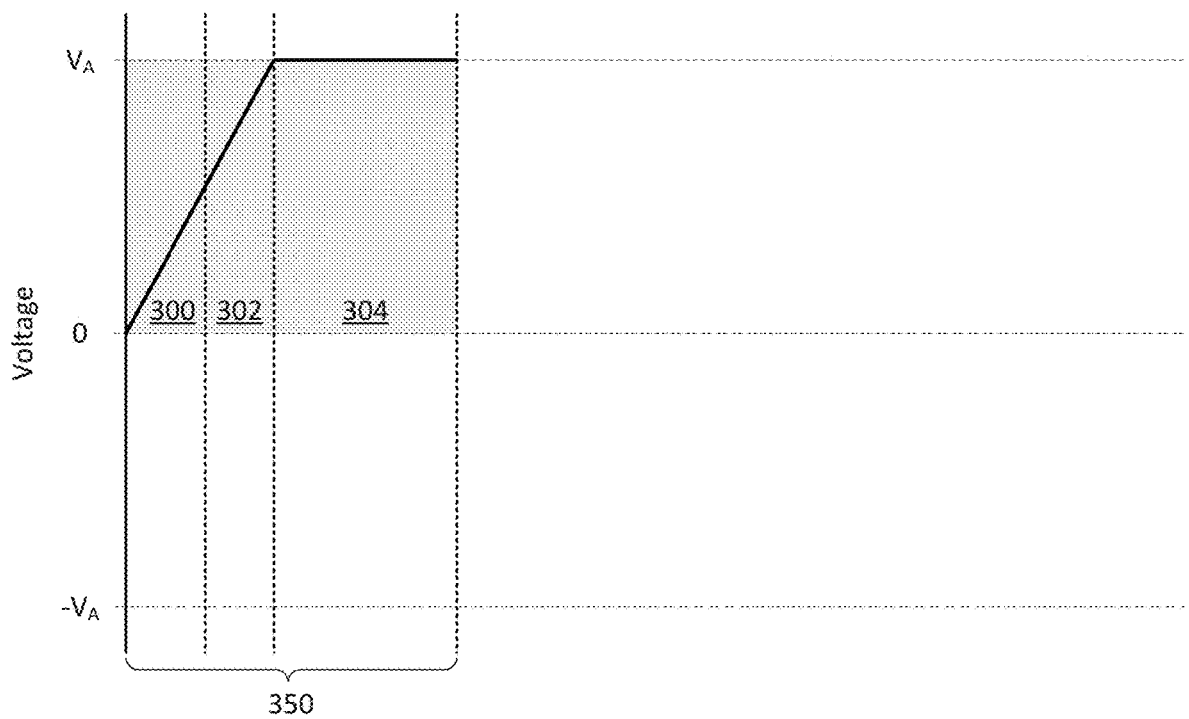

FIG. 7D shows an exemplary plot of voltage vs. time at the load 240 (e.g., a capacitive load) during the charging steps shown in FIGS. 7A-7C. As shown, charging process 350 includes a first step 300 corresponding to the step shown in FIG. 7A, which results in charging of the load. The charging process 350 further includes a second step 302 corresponding to the step shown in FIG. 7B, wherein the load continues to charge. The charging process 350 still further includes a third step 304, as shown in FIG. 7C and in which current paths are eliminated from the load to maintain a charged state. In the illustrated example of FIG. 7D, the voltage across the load after the charging process 350 is approximately equal to the voltage $V_A$ provided by power source 210.

It will be appreciated that the plot in FIG. 7D is illustrative and does not limit the charging process 850. For example, in various embodiments, the relative widths (durations) of each step (300, 302, 304) may be different from what is shown in the exemplary plot. For instance, in some examples, the duration of step 302 (e.g., the duration of the configuration shown in FIG. 7B) is limited to prevent draining of energy to ground 220 rather than contributing to the charging of load 240 such as in embodiments without isolating component 224. Additionally or alternatively, the plot of voltage vs. time may not necessarily be linear during one or more steps of the charging process 350.

Exemplary Discharging Process

Figure 8A:
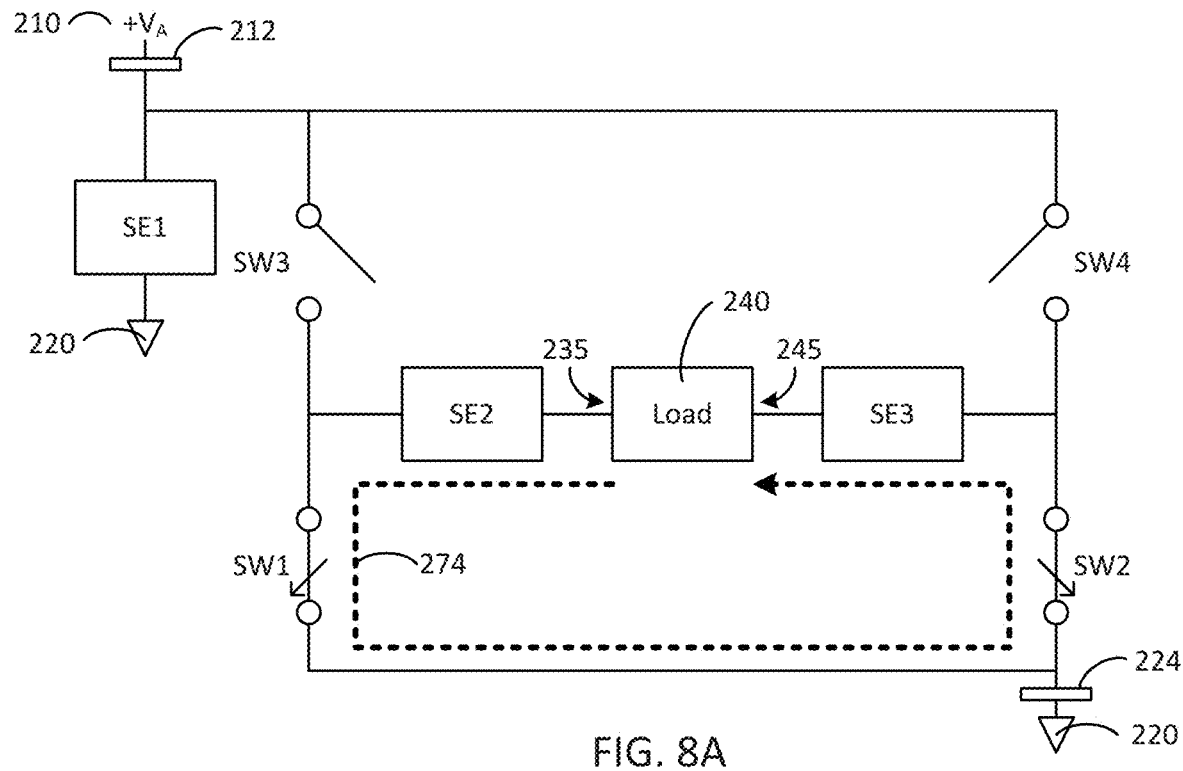
FIGS. 8A-8D illustrate an exemplary discharging process for discharging a load via a driver such as shown in FIG. 6.

FIGS. 8A-8D illustrate an exemplary discharging process for discharging a load via a driver such as shown in FIG. 6. FIG. 8A shows a first step of the discharging process, for example, to be performed after the charging process described with respect to FIGS. 7A-7D. For example, in some embodiments, after a charging process, a positive voltage is present across the load 240, where the first side 235 of the load 240 is at a higher voltage than the second side of the load 240.

The first step of the discharging process comprises positioning the switching mechanisms so that the first switching mechanism SW1 and the second switching mechanism SW2 are closed, creating a current path 274 including the load 240, the second energy storage element SE2, the first switching mechanism SW1, the second switching mechanism SW2, and the third energy storage element SE3. Third switching mechanism SW3 and fourth switching mechanism SW4 are open. Once current path 274 is created, a positive voltage on the load 240 (e.g., a capacitive load) can cause current to flow from load 240 through current path 274, thereby beginning discharge of the load 240 and, in some examples (e.g., including inductive energy storage elements SE2, SE3), energizing energy storage elements SE2 and SE3 by flowing current therethrough. In some examples, isolating component 224 can prevent current from leaking to ground 220.

Figure 8B:
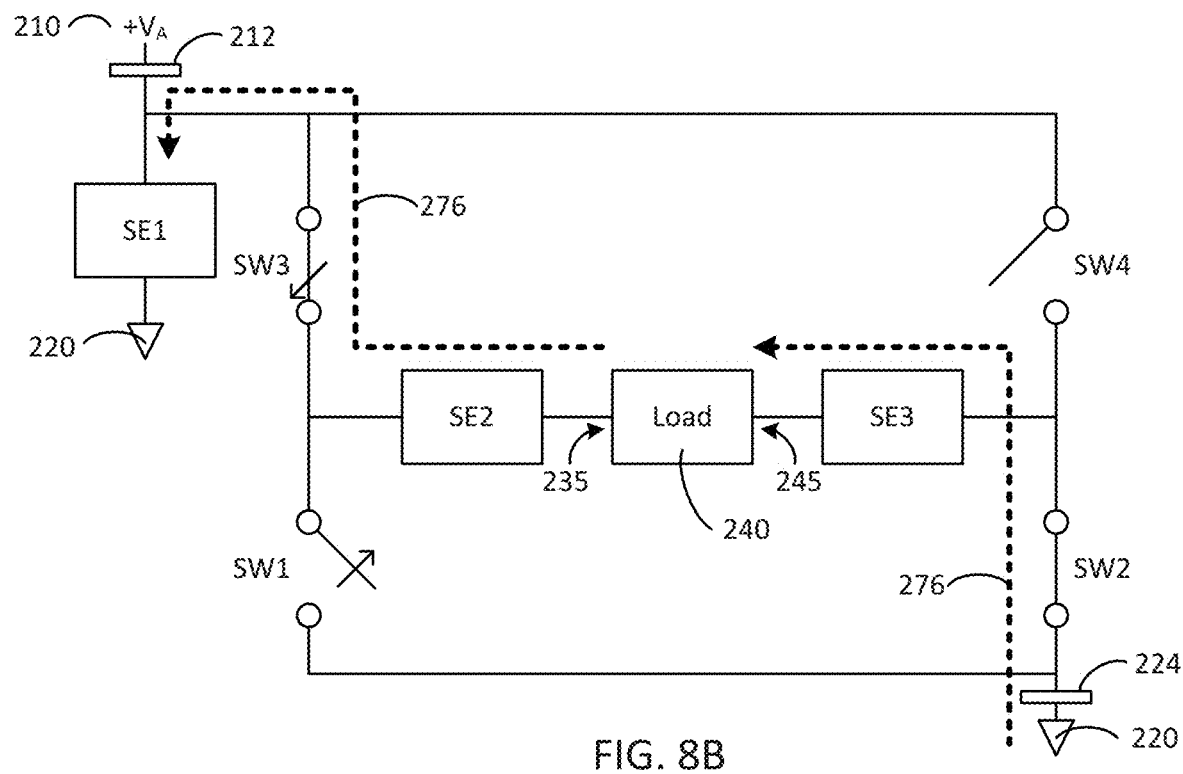

FIG. 8B shows a second step in the discharging process. As shown, first switching mechanism SW1 is opened and third switching mechanism SW3 is closed, creating a current path 276. Current can flow through current path 276 to the first energy storage element SE1, for example, due to energy stored in the second energy storage element SE2 and the third energy storage element SE3 in the first step of the discharging process (FIG. 8A). That is, in some embodiments (e.g., including inductive SE2, SE3), energy stored in the second and third energy storage elements SE2, SE3 during the first step (FIG. 8A) can be discharged to the first energy storage element SE1 when adjusting the switching mechanisms as shown in FIG. 8B. This allows for at least some of the electrical energy used to charge the load 240 during the charging process (e.g., shown in steps 7A-7C) can be used to energize second and third energy storage elements SE2, SE3, and then first energy storage element SE1. In some examples, isolating component 212 can prevent the power source 210 from impacting the transfer of energy, for example, to the first energy storage element SE1.

Figure 8C:
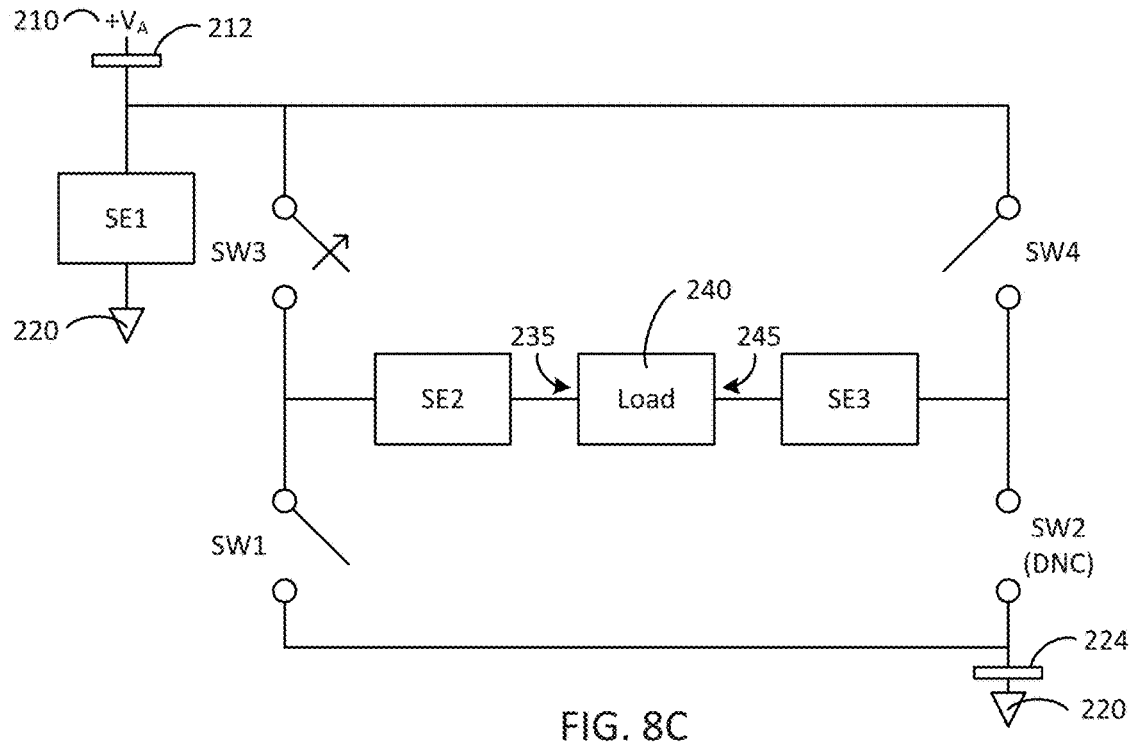

FIG. 8C shows a third step in the discharging process. In the third step, third switching mechanism SW3 and second switching mechanism SW2 are opened, while first switching mechanism SW1 and fourth switching mechanism SW4 remain open. This removes current flow paths from load 240 and from the first energy storage element SE1, thereby floating the load 240 at a low magnitude (discharged) voltage while SE1 remains charged with recycled energy from the previously charged load 240.

Figure 8D:
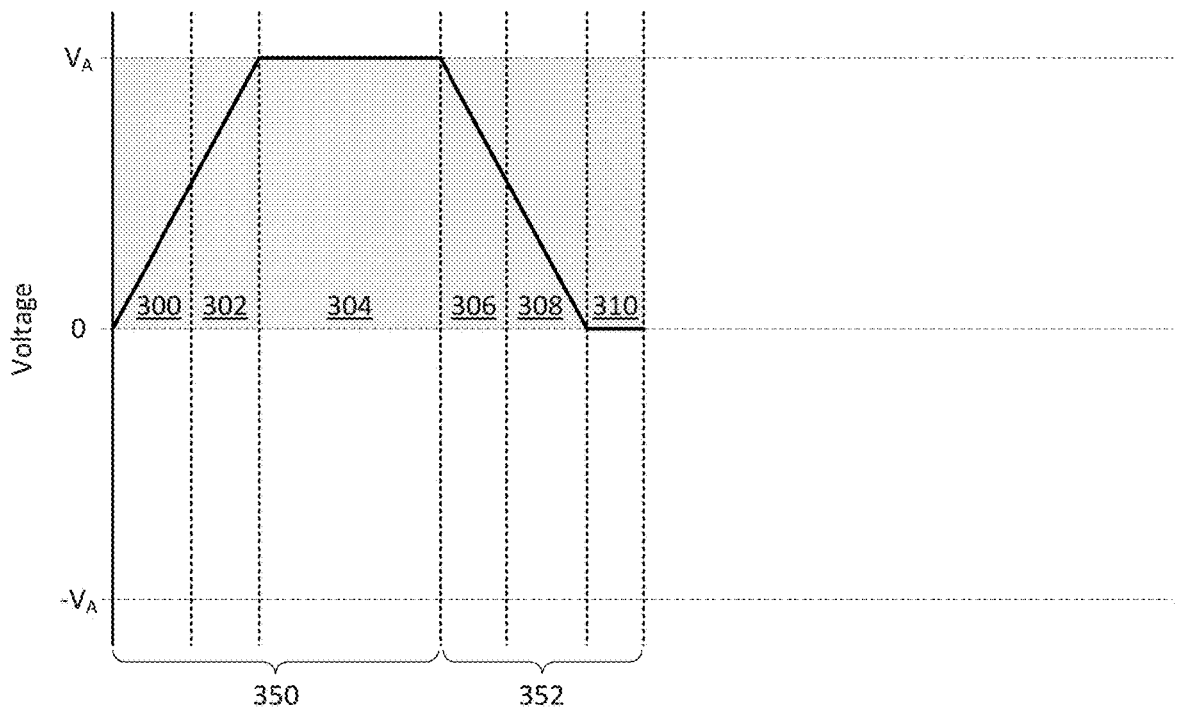

FIG. 8D shows an exemplary plot of voltage vs. time at the load 240 (e.g., a capacitive load) during the charging steps shown in FIGS. 7A-7C and the discharging steps shown in FIGS. 8A-8C. As shown, discharging process 352 includes a first discharging step 306 corresponding to the step shown in FIG. 8A, which results in discharging of the load (e.g., resulting in energizing of energy storage elements SE2, SE3). The discharging process 352 further includes a second step 308 corresponding to the step shown in FIG. 8B, wherein the load continues to discharge while energy is transferred to the first energy storage element SE1. The discharging process 352 still further includes a third step 310, as shown in FIG. 8C and in which current paths are eliminated from the load to maintain a discharged state.

As noted with respect to FIG. 7D, the plot of voltage vs. time at the load is exemplary, and is not necessarily shown to scale. In various examples, the shape of the voltage vs. time plot need not be linear during one or more steps of the discharging process 352. Additionally or alternatively, the discharging process 352 may be performed a plurality of times to achieve a complete discharge of the load.

Exemplary Reverse Charging Process

Figure 9A:
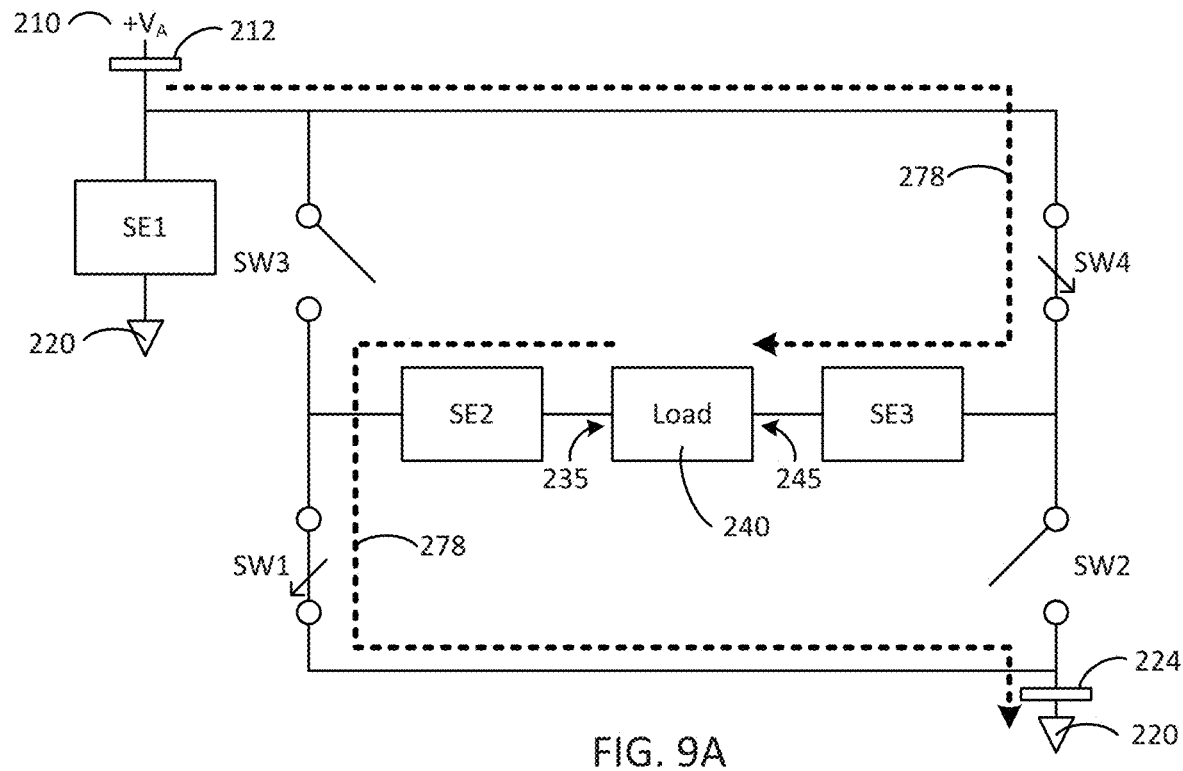
FIGS. 9A-9D illustrate an exemplary reverse-charging process for charging a load in an opposite polarity with respect to the charging process of FIGS. 7A-7D via a driver such as shown in FIG. 6.

FIGS. 9A-9D illustrate an exemplary reverse-charging process for charging a load in an opposite polarity with respect to the charging process of FIGS. 7A-7D via a driver such as shown in FIG. 6. FIG. 9A shows a first step of the reverse charging process. In the first step, the first switching mechanism SW1 and the fourth switching mechanism SW4 are closed, while the third switching mechanism SW3 and the second switching mechanism SW2 are open. This creates a current path 278 from power source 210 and/or first energy storage element SE1 through the fourth switching mechanism SW4, the third energy storage element SE3, the load 240, the second energy storage element SE2, the first switching mechanism SW1 to ground 220. In this example, current flows in a second direction (from the second side 245 toward first side 235) through the load 240, the second direction being opposite the first load. In some examples, for instance, in the case of a capacitive load, the load 240 charges in a second polarity that is opposite the first polarity. As noted, current flowing in current path 278 could be at least partially provided by first energy storage element SE1, for example, using energy recovered from the first discharging process described with respect to FIGS. 8A-8D. In some examples, isolating component 212 can be used to inhibit current from being provided from power source 210, instead drawing current from first energy storage element SE1.

Figure 9B:
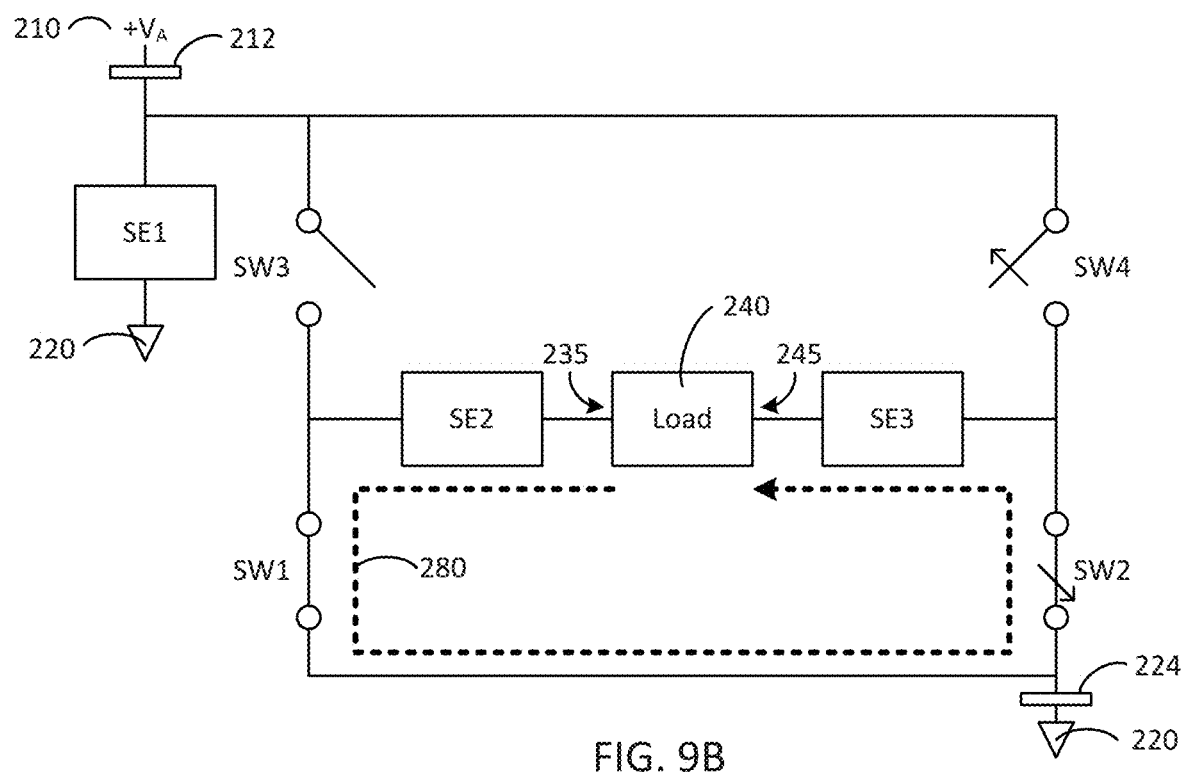

FIG. 9B shows a second step in the reverse charging process. In the second step (relative to the configuration shown in first step), the fourth switching mechanism SW4 is opened and the second switching mechanism SW2 is closed. This creates a current path 280 that includes the load 240, the second energy storage element SE2, the first switching mechanism SW1, the second switching mechanism SW2, and the third energy storage element SE3. In some examples, current continues to flow in the second direction through the load 240 based on the behavior of the load 240 and/or one or both of the second energy storage element SE2 and the third energy storage element SE3. For instance, in an exemplary embodiment, second energy storage element SE2 and the third energy storage element SE3 comprise matched inductors, which are energized by the current flowing therethrough in step one of the reverse charging process shown in FIG. 9A. The energized inductors cause current to continue to flow through the load in the second direction via current path 280 when the second step shown in FIG. 9B is performed. Isolating component 224 may be used to prevent current from leaking from current path 280 to ground 220.

Figure 9C:
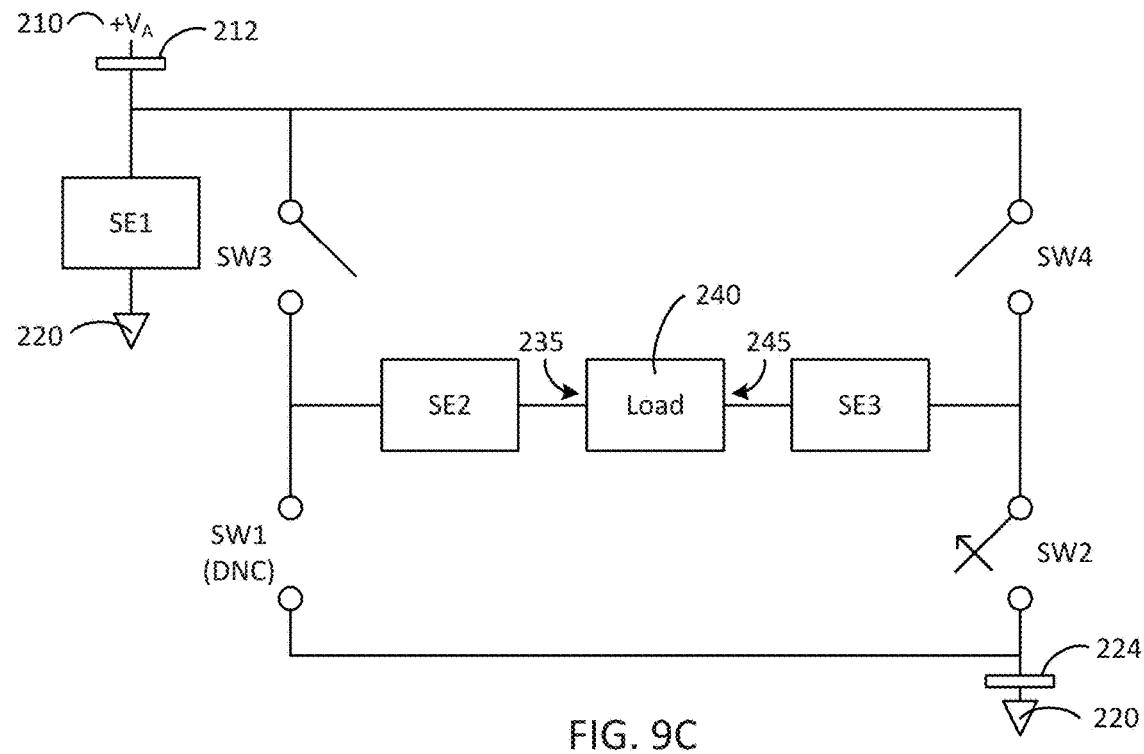

FIG. 9C shows a third step in the reverse charging process. In the illustrated example, the second switching mechanism SW2 is opened, eliminating any current loops containing the load 240. In some such examples, first switching mechanism SW1 is also opened in which case the second switching mechanism SW2 can remain closed. Breaking the current path by opening either SW1 or SW2 approximately maintains the charge level of load 240 at a constant value.

Figure 9D:
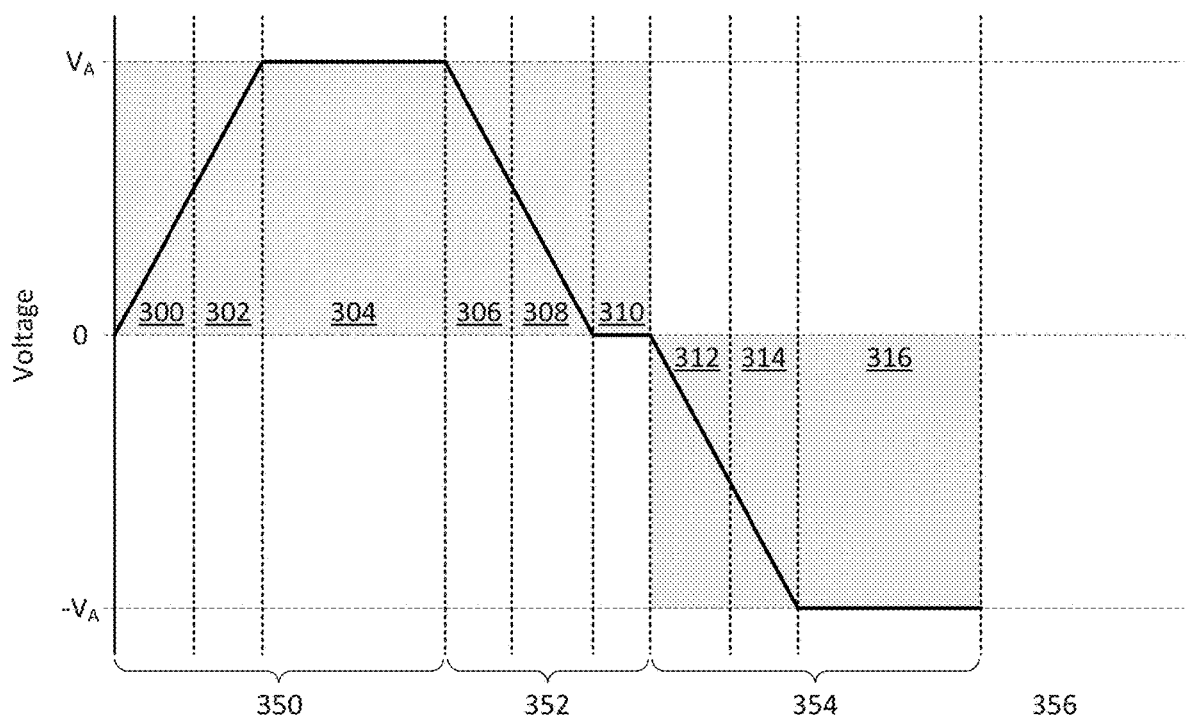

FIG. 9D shows an exemplary plot of voltage vs. time at the load 240 (e.g., a capacitive load) during the reverse charging steps shown in FIGS. 9A-9C, in addition to the prior charging and discharging steps. As shown, reverse charging process 354 follows discharging process 352 and includes a first step 312 corresponding to the step shown in FIG. 9A, which results in charging of the load 340 in the second polarity. The second polarity is opposite the first polarity, in which the load was charged during the charging process 350. For instance, as shown in FIG. 9D, during step one 312 of the reverse charging process 354, the magnitude of the voltage generally increases similarly to as in step one 300 of the charging process 350, but in the opposite polarity. Thus, the reverse charging process 354 generally increases the magnitude of the charge on the load 240, but in the opposite polarity as the charging process 350.

The reverse charging process 354 further includes a second step 314 corresponding to the step shown in FIG. 9B, wherein the load continues to charge in the second polarity. The charging process 350 still further includes a third step 304, as shown in FIG. 9C and in which current paths are eliminated from the load to maintain a reverse charged state. In the illustrated example of FIG. 9D, the voltage across the load 240 at step 304 of the charging process 350 is approximately equal in magnitude but opposite in polarity to the voltage across the load 240 at step 316 of the reverse charging process 354. In various examples, the magnitude of the voltage in either or both such steps is approximately equal to the rail voltage ($V_A$) applied by the power source 210.

It will be appreciated that, similar to the plots in FIGS. 7D and 8D, the plot in FIG. 9D is illustrative and does not limit the charging process 854. For example, in various embodiments, the relative widths (durations) of each step (312, 314, 316) may be different from what is shown in the exemplary plot. For instance, in some examples, the duration of step 314 (e.g., the duration of the configuration shown in FIG. 9B) is limited to prevent draining of energy to ground 220 rather than contributing to the reverse charging of load 240, such as in embodiments without isolating component 224. Additionally or alternatively, the plot of voltage vs. time may not necessarily be linear during one or more steps of the reverse charging process 354.

Exemplary Reverse Discharging Process

Figure 10A:
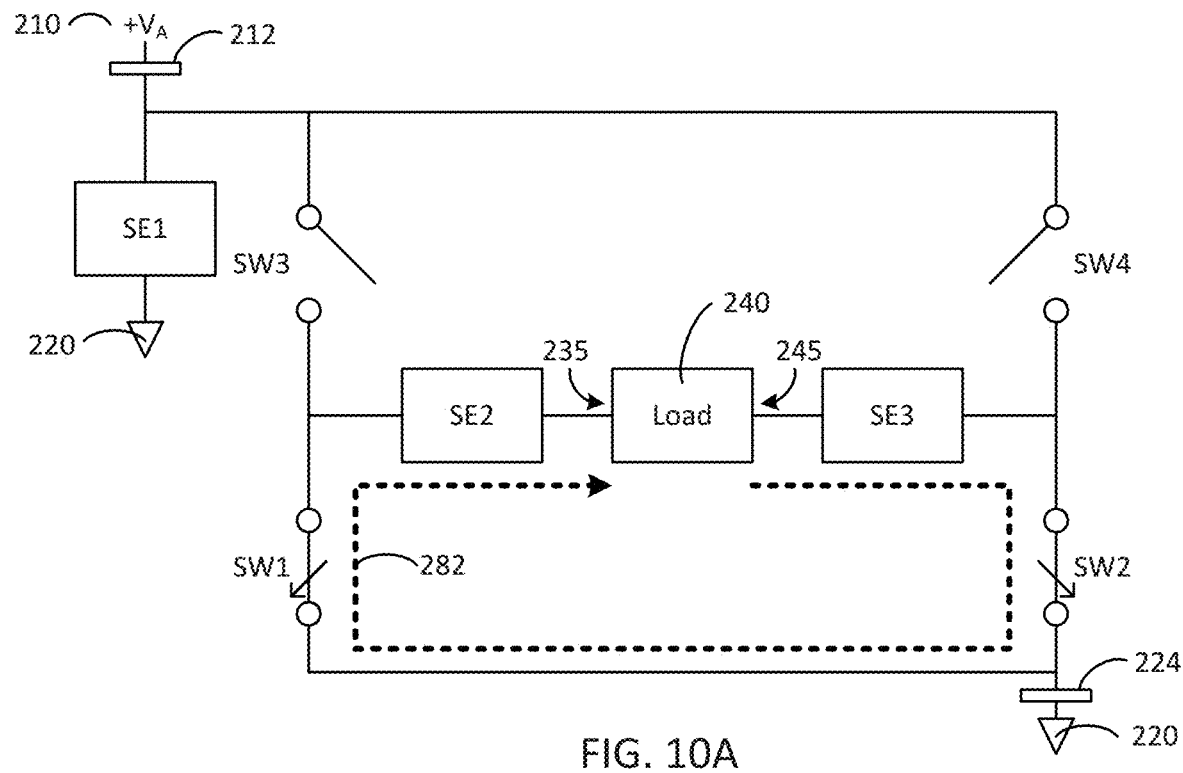
FIGS. 10A-10D illustrate an exemplary reverse discharging process for discharging a reverse-charged load via a driver such as shown in FIG. 6.

FIGS. 10A-10D illustrate an exemplary reverse discharging process for discharging a reverse-charged load via a driver such as shown in FIG. 6. FIG. 10A shows a first step of the reverse discharging process, for example, to be performed after the reverse charging process described with respect to FIGS. 9A-9D. For example, in some embodiments, after a reverse charging process, a voltage of the second polarity is present across the load 240, wherein the second side 245 of the load 240 is at a higher voltage than the first side 235 of the load 240 (e.g., approximately $-V_A$ as shown in FIG. 9D).

The first step of the discharging process comprises positioning the switching mechanisms so that the first switching mechanism SW1 and the second switching mechanism SW2 are closed, creating a current path 282 including the load 240, the third energy storage element SE3, the second switching mechanism SW2, the first switching mechanism SW1, and the second energy storage element SE2. Third switching mechanism SW3 and fourth switching mechanism SW4 are open. Once current path 282 is created, a voltage on the load 240 in the second polarity (wherein the voltage at second side 245 of the load 240 is greater than at the first side 235) can cause current to flow from load 240 through current path 282, thereby beginning discharge of the load 240. In some examples (e.g., including inductive energy storage elements SE2, SE3), discharging the load via current path 282 can energize energy storage elements SE2 and SE3 by causing current to flow therethrough. Isolating component 224 may be used to prevent current from leaking from current path 282 to ground 220.

Figure 10B:
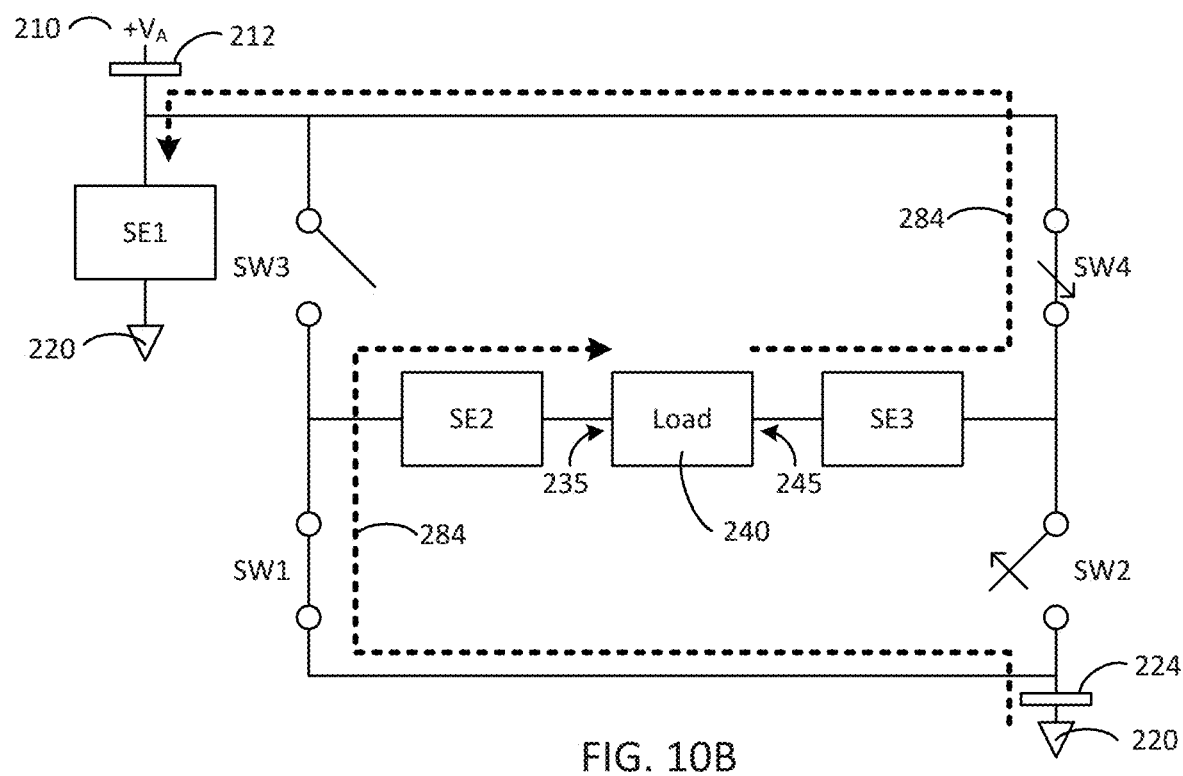

FIG. 10B shows a second step in the reverse discharging process. As shown, second switching mechanism SW2 is opened and fourth switching mechanism SW4 is closed, creating a current path 284. Current can flow through current path 284 to the first energy storage element SE1, for example, due to energy stored in the second energy storage element SE2 and the third energy storage element SE3 in the first step of the reverse discharging process (FIG. 10A). That is, in some embodiments (e.g., including inductive SE2, SE3), energy stored in the second and third energy storage elements SE2, SE3 during the first step (FIG. 10A) can be discharged to the first energy storage element SE1 when configuring the switching mechanisms as shown in FIG. 10B. This allows for at least some of the electrical energy used to charge the load 240 during the reverse charging process (e.g., shown in steps 9A-9C) can be used to energize second and third energy storage elements SE2, SE3, and then first energy storage element SE1. In some examples, isolating component 212 can prevent the power source 210 from impacting the transfer of energy, for example, to the first energy storage element SE1.

Figure 10C:
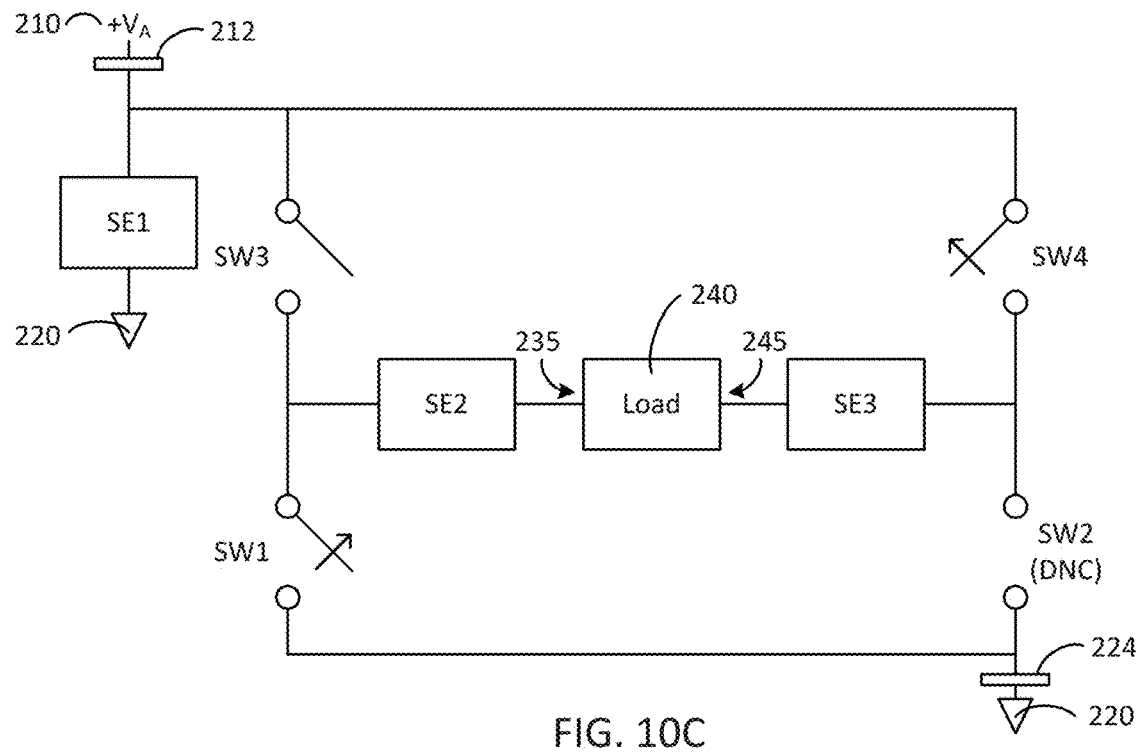

FIG. 10C shows a third step in the reverse discharging process. In the third step, fourth switching mechanism SW4 and first switching mechanism SW1 are opened, while second switching mechanism SW2 and third switching mechanism SW3 remain open. This removes current flow paths from load 240 and from the first energy storage element SE1, thereby floating the load 240 at a low magnitude (discharged) voltage while SE1 remains charged with recycled energy from the previously reverse-charged load 240.

Figure 10D:
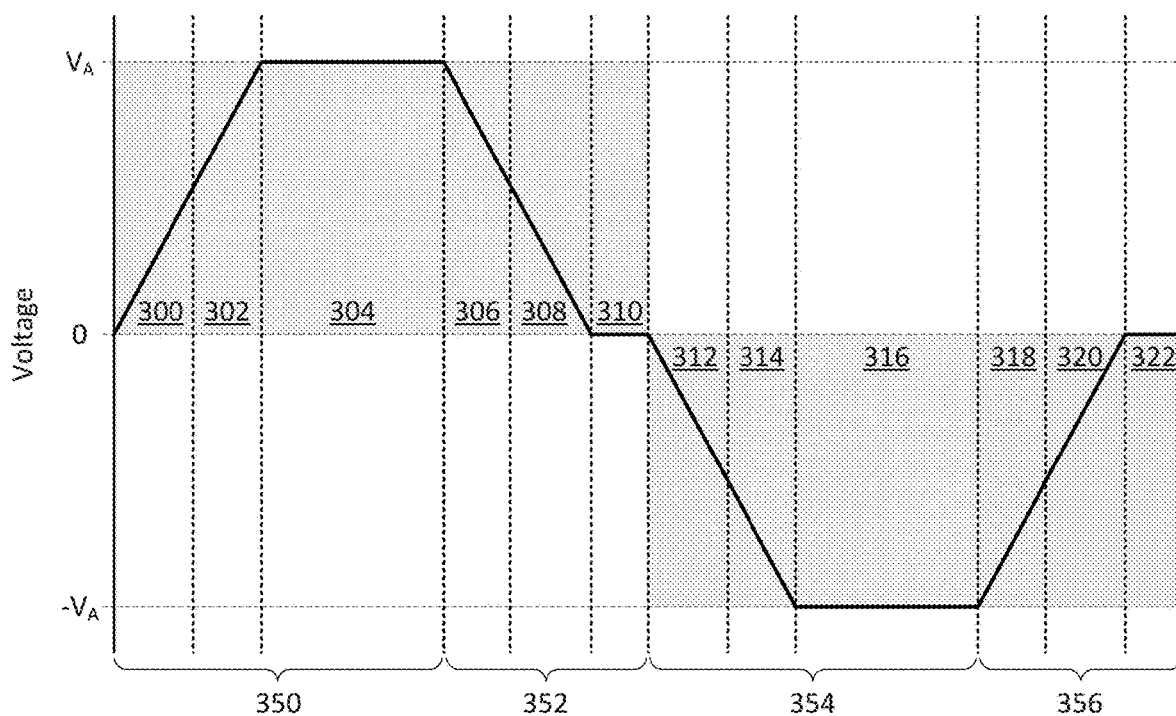

FIG. 10D shows an exemplary plot of voltage vs. time at the load 240 (e.g., a capacitive load) during the charging steps shown in FIGS. 7A-7C, the discharging steps shown in FIGS. 8A-8C, the reverse charging steps shown in FIGS. 9A-9C, and the reverse discharging steps shown in FIGS. 10A-10C. As shown, the reverse discharging process 356 includes a first reverse discharging step 318 corresponding to the step shown in FIG. 10A, which results in discharging of the load (e.g., resulting in energizing of energy storage elements SE2, SE3). The reverse discharging process 356 further includes a second step 320 corresponding to the step shown in FIG. 10B, wherein the load continues to discharge while energy is transferred to the first energy storage element SE1. The reverse discharging process 356 still further includes a third step 322, as shown in FIG. 10C and in which current paths are eliminated from the load to maintain a discharged state.

The plot of FIG. 10D shows an exemplary plot of voltage across the load 240 vs time during a charging process 350, a discharging process 352, a reverse charging process 354, and a reverse discharging process 356. In the illustrated example, the reverse charging process 354 appears to be approximately equal in magnitude and opposite in sign to the charging process 350. Similarly, the reverse discharging process 356 appears to be approximately equal in magnitude and opposite in sign to the discharging process 352. Thus, the voltage across the load 240 alternates between approximately $V_A$ and $-V_A$.

As described elsewhere, the voltage vs. time plots in FIGS. 7D, 8D, 9D, and 10D are not necessarily to scale. For example, in some embodiments, the duration of an approximately constant charge state in which the magnitude of the voltage is approximately equal to $V_A$ (step 304 in the charging process 350 and step 316 in the reverse charging process 354) is significantly greater than the combined durations of the intervening steps (e.g., the discharging process 352 and the first 312 and second 314 steps of the discharging process).

In some embodiments, a driver (e.g., driver 200 in FIG. 6 including controller 260) can be configured to repeatedly apply a voltage signal to a load such as that shown in FIG. 10D. That is, after completing the reverse discharging process 356, the driver can repeat the signal by initiating the charging process 350. In some examples, the driver can be configured to repeatedly cycle through the charging process 350, the discharging process 352, the reverse charging process 354, and the reverse discharging process 356. Such cycling through such processes can act to continuously alternate polarities of an applied voltage $V_A$ to a load, such as an optically active material.

With further reference to FIG. 6, driver 200 includes a power source 210, a switching network 230 including plurality of switching mechanisms SW1, SW2, SW3, SW4, energy storage elements SE1, SE2, SE3, and a controller 260 configured to operate the switching network. When configured to drive an optically active material, such as shown in the configuration of FIG. 3 (e.g., including driver 60 arranged to control optically active material 18 via electrode layers 20 and 22), the driver can be configured to apply a voltage $V_A$ corresponding to a desired optical state (e.g., a transparent state) to the optically active material. The driver can be further configured to alternatingly apply the voltage $V_A$ to the optically active material in different polarities, for example, as shown in the voltage vs. time curve of FIG. 10D, repeated a plurality of times.

With reference back to FIG. 6, in an exemplary embodiment, controller 260 can be configured to control the switching of the switching mechanisms SW1, SW2, SW3, SW4 of the switching network 230 in a particular order of switch combinations in order to apply such a voltage to the optically active material. In an exemplary embodiment, the order of sequential switching mechanism configurations can include the configurations in FIGS. 7A→7B→7C→8A→8B→8C→9A→9B→9C→10A→10B→10C→7A→7B→ . . . where the cycle repeats as desired. The cycle can be run in reverse, or similarly, can be phase shifted, e.g., by half a period, where the order of sequential switching mechanism configurations can include the configurations in FIGS. 10C→10B→10A→9C→9B→9A→8C→8B→8A→7C→7B→7A→10C→10B→ . . . which can similarly be repeated as desired. Either order (e.g., whether the voltage of the first side 235 is greater or less than the voltage of the second side 245 in the first charge/reverse charge cycle) may ultimately result in alternating polarities of an applied voltage $V_A$ to the optically active material, for example, to approximate a square wave.

With respect to the driver configurations shown in FIGS. 6-10, in various embodiments, a variety of energy storage technologies may be used as energy storage elements, such as inductive elements, capacitive elements, or the like. In some examples, first energy storage element SE1 comprises a capacitive energy storage element. Additionally or alternatively, second energy storage element SE2 and/or third energy storage element SE3 can include an inductive energy storage element. In some embodiments, the load 240 comprises a capacitive load. For example, in some embodiments, an optically active material positioned between electrodes (e.g., optically active material 18 between first electrode layer 20 and second electrode layer 22) comprises a capacitive load.

The configuration of energy storage elements in combination with operation of the switching mechanisms permits energy to be applied to and stored in the optically active material, and then extracted therefrom and at least partially recycled for subsequent use. This leads to increased efficiency when controlling a load (e.g., a capacitive load) with a signal having alternating polarities, such as a square wave. In a particular implementation, this leads to increased efficiency when controlling an optically active material with a driver producing an approximate square wave drive signal to reduce errors from applying a DC signal.

In various examples, optically active materials can be optically controlled based on an electrical potential applied thereacross, regardless of the polarity of the potential. For instance, in some embodiments, an electrical potential of a sufficiently large magnitude applied across an optically active material can result in a first optical state, while an electrical potential with a sufficiently small magnitude applied thereacross can result in a second optical state. In some such examples, the first optical state can correspond to a substantially transparent state, while the second optical state can correspond to a substantially opaque state. In other examples, the first optical state corresponds to a substantially opaque state, while the second optical state correspond to a substantially transparent state. In still further examples, an optically active material can assume more than two optical states based on the magnitude of the electrical potential applied thereacross, for example, electrochromic materials, dye-doped liquid crystals, or the like. In general, applying a variety of voltage magnitudes across an optically active material can be useful for controlling optical states of an optical structure, such as an electrically dynamic window.

With reference back to FIG. 6, in some embodiments, controller 260 can be configured to adjust the magnitude of the voltage $V_A$ provided at power source 210. For instance, in some examples, controller 260 is in communication with a user interface and is configured to receive an input from the user interface, such as a selection of a desired optical state of an optically dynamic window driven by driver 200. The controller 260 can be configured to identify a desired optical state, such as an optical state received via a user interface, and determine an appropriate voltage $V_A$ to apply to the switching network 230 to achieve the desired optical state. In various examples, the controller 260 can determine the appropriate voltage based on an equation relating an input signal to an applied voltage, via a lookup table, or other techniques.

Figure 11:
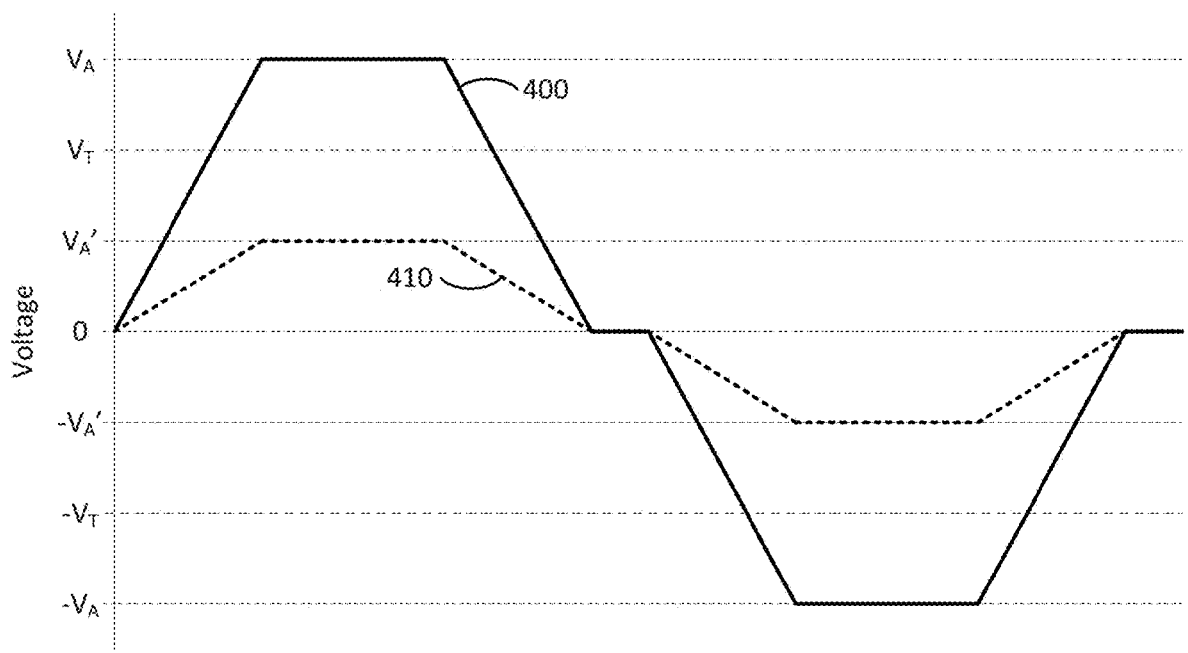
FIG. 11 shows an exemplary voltage vs. time plot of signals from a driver for two different optical states for an optically active material.

FIG. 11 shows an exemplary voltage vs. time plot of signals from a driver for effecting two different optical states from an optically active material. In the illustrated example, a first signal 400 corresponds to a voltage magnitude of $V_A$, transitioning between voltage values of $V_A$ and $-V_A$ (e.g., per transitioning between switching arrangements as described elsewhere herein. A second signal 410 corresponding to a voltage magnitude of $V_A'$, transitioning between voltage values of $V_A'$ and $-V_A'$. In some examples, switching between signals 400 and 410 corresponds to changing a voltage applied by power source 210, while continuing to control switching mechanisms in a cyclical pattern such as described elsewhere herein.

The exemplary plot of FIG. 11 includes a threshold voltage $V_T$. In an exemplary embodiment, $V_T$ corresponds to a voltage magnitude above which an optically active material assumes a first optical state (e.g., substantially transparent) and below which the optically active material assumes a second optical state (e.g., substantially opaque). As shown $0<|V_A'|<|V_T|<|V_A|$, so that when signal 400 is applied by the driver to the optically active material, the optically active material assumes the first optical state, and when signal 410 is applied to the optically active material, the optically active material assumes the second optical state. As described elsewhere herein, in some examples, the driver is configured to adjust the applied voltage (e.g., between $V_A$ and $V_A'$) in response to a received input from a user interface in order to adjust the optical state of an optically active material.

In some embodiments, various steps in transitioning between different switching configurations are performed quickly enough to minimize the duration of various stages. As described elsewhere herein, in some embodiments, the voltage being above or below a threshold can result in a difference between a first optical state and a second optical state. For example, with reference to FIG. 11, the magnitude of signal 410 alternates between $V_A'$ and $-V_A'$, which is below the magnitude of threshold voltage $V_T$. Thus, the optical state associated with signal 410 should remain consistent at the second optical state. The magnitude of signal 400, on the other hand, alternates between $V_A$ and $-V_A$, which is greater than $V_T$, to achieve the first optical state. However, during the transition between $V_A$ and $-V_A$, there are times when the magnitude of the voltage of signal 400 drops below the threshold voltage $V_T$, which could undesirably cause the optical state to waver from the first optical state.

Accordingly, in some embodiments, various transitions between and through certain switching configurations of the switching mechanisms in the switching network can be performed quickly enough to minimize and/or eliminate undesirable optical effects. For example, with reference to FIG. 10D, steps 306, 308, and 310 in the discharging process 352, as well as steps 312 and 314 in the reverse charging process, are performed quickly enough to prevent transition between optical states between steps 304 and 316. Instead, the optical state associated with the voltage at steps 304 and 316 is retained during the transition between such steps due to sufficiently fast switching of the switching mechanisms. In some examples, switching between the various switching mechanisms is timed so that the signal applied to the load approximates a square wave.

As described, in various embodiments, a driver can be configured to apply different electrical signals to an optically active material corresponding to different desired optical states of the optically active material. In some embodiments, the driver is configured to continually apply an alternating signal (e.g., a square wave) to the optically active material regardless of the desired optical state for the optically active material. For instance, with respect to FIG. 11, when switching between optical states, driver can adjust operation between applying signal 400 and signal 410 to an optically active material. However, neither state (e.g., corresponding to $V_A$ or $V_A'$) corresponds to the application of no alternating signal to the optically active material. However, in other examples, for instance, if a desired optical state corresponds to a 0V potential across an optically active material, an alternating signal can be discontinued and/or disconnected from the optically active material to achieve and maintain the optical state.

Figure 12:
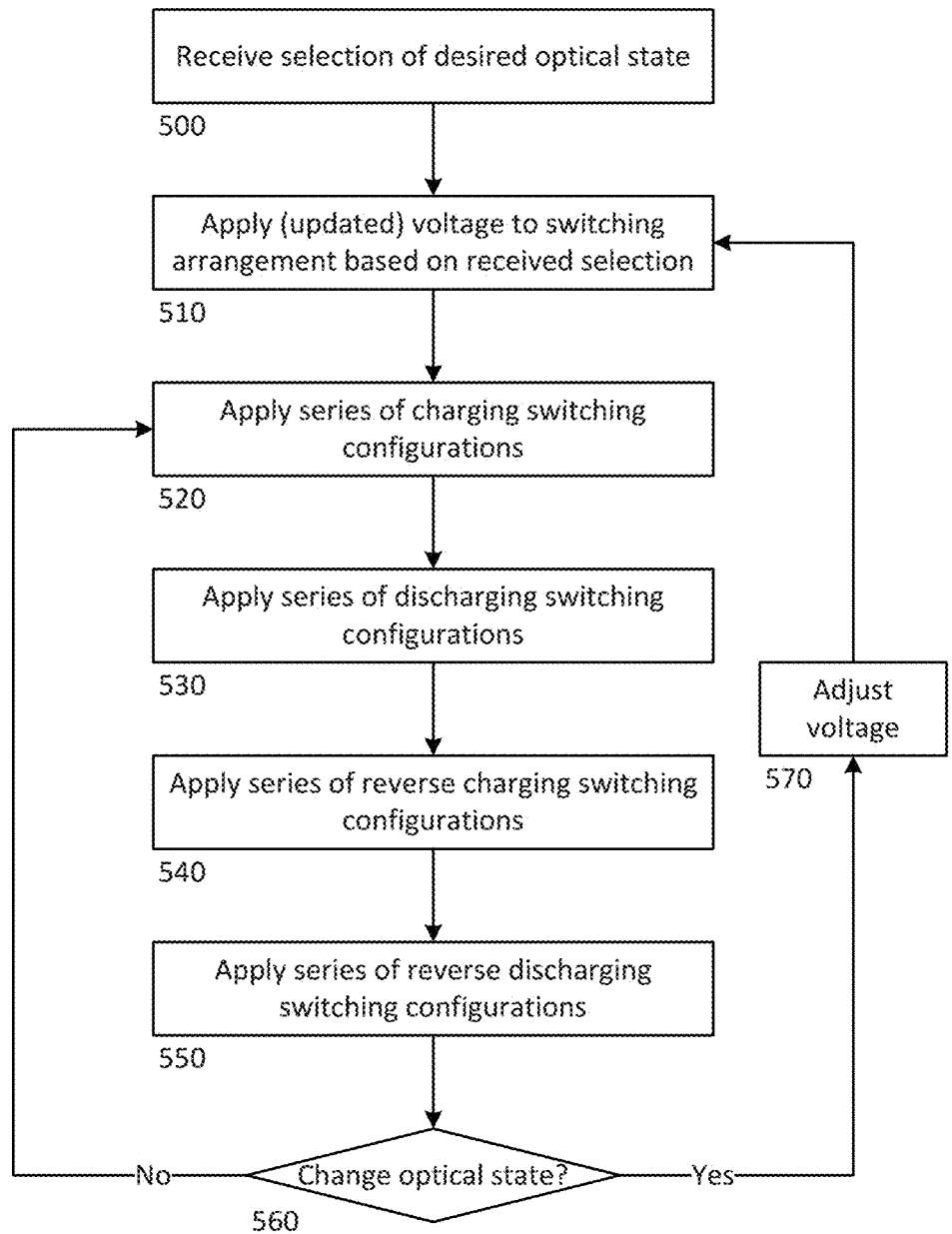
FIG. 12 is a process-flow diagram illustrating an exemplary control process for operating an optically active material, such as in an electrically dynamic window.

FIG. 12 is a process-flow diagram illustrating an exemplary control process for operating an optically active material, such as in an electrically dynamic window. The method of FIG. 12 includes the step of receiving a selection of a desired optical state for the optically active material (500), and applying a voltage to the switching arrangement based on the received selection (510). As described elsewhere herein, the applied voltage may be a sufficient voltage to achieve the desired optical state, and may be determined via a lookup table stored in a memory or the like.

The method further comprises the step of applying a series of charging switching configurations to the optically active material (520), for example, to apply a charge to the optically active material in a first polarity. The series of charging switching configurations can correspond, for example, to the configurations shown in FIGS. 7A-7C.

Next, the method includes applying a series of discharging switching configurations to the optically active material (530), in order to reduce the charge on the optically active material. As described, in some embodiments, during the discharging process, energy discharged from the optically active material may be recaptured and stored for future use. The series of discharging switching configurations can correspond, for example, to the configurations shown in FIGS. 8A-8C.

The method further includes the step of applying a series of reverse charging switching configurations to the optically active material (540), for example, to apply a charge to the optically active material in a second polarity opposite the first. The series of reverse charging switching configurations can correspond, for example, to the configurations shown in FIGS. 9A-9C.

Next, the method includes applying a series of reverse discharging switching configurations to the optically active material (550), in order to reduce the charge on the optically active material. As described, in some embodiments, during the reverse discharging process, energy discharged from the optically active material may be recaptured and stored for future use. The series of discharging switching configurations can correspond, for example, to the configurations shown in FIGS. 10A-10C.

The method of FIG. 12 can further include the step of determining whether or not the optical state should be changed (560). If not, the switching process can repeat, for example, by applying the series of charging switching configurations (520) and proceeding through the method again. However, in the event that the optical state is to be changed (at step 560), the method can include the step of adjusting the applied voltage (570) before applying the (updated) voltage to the switching arrangement (510).

In various embodiments, the step(s) of applying a series of charging switching configurations (520) and/or applying the series of reverse charging switching configurations (540) can include applying energy to the optically active material recaptured from the optically active material in a previous discharging process (e.g., energy stored in first energy storage element SE1).

As described elsewhere herein, in some embodiments, a driver for driving an optically active material can include a controller configured to adjust operation of one or more switching mechanisms in a switching network and/or to adjust the voltage applied to the switching mechanisms. In some examples, the controller operates in response to an input from a user interface, such as a command from a user interface to change the optical state of the optically active material.

In various examples, the controller can include one or more components configured to process received information, such as a received input from a user interface, and perform one or more corresponding actions in response thereto. Such components can include, for example, one or more application specific integrated circuits (ASICs), microcontrollers, microprocessors, field-programmable gate arrays (FPGAs), or other appropriate components capable of receiving and output data and/or signals according to a predefined relationship. In some examples, such one or more components can be physically integrated with the other driver components, such as the switching network and the like.

A user interface in communication with the controller can include a switch or other component in wired or wireless communication with the controller. For instance, a hard switch (e.g., a wall switch proximate an optically dynamic window structure) can be coupled to the controller and can switch between two or more switching states, each corresponding to an optical state of the controller optically active material. Additionally or alternatively, the driver may be configured to communicate with an external component, such as a smartphone or tablet via wireless communication or an internet-connected device (e.g., through a hard-wired or wireless network connection). In some embodiments, the controller can receive a signal from such an external device corresponding to a desired optical state of the optically active material, and can control the optically active material accordingly.

Various examples have been described. These and other examples are within the scope of the following claims.

The invention claimed is:

1. An electrically dynamic window structure comprising:
a first pane of transparent material;
a second pane of transparent material;
an electrically controllable optically active material positioned between the first pane of transparent material and the second pane of transparent material, the electrically controllable optically active material being positioned between a first electrode layer and a second electrode layer; and
a driver electrically connected to the first electrode layer and the second electrode layer, wherein the driver is electrically connected to a power source and configured to provide a drive signal to the first electrode layer and the second electrode layer for controlling the electrically controllable optically active material, wherein the driver includes an energy storage element and is configured to:
charge the electrically controllable optically active material to a first charge state, the first charge state comprising a first voltage across the electrically controllable optically active material,
subsequently discharge the electrically controllable optically active material in a first discharge process, including storing energy in the energy storage element released from the electrically controllable optically active material during the first discharge process, and
subsequently charge the electrically controllable optically active material to a second charge state, opposite the first charge state, wherein
the second charge state comprises a voltage across the electrically controllable optically active material that is approximately equal in magnitude but opposite in polarity compared to the first charge state, and
the first charge state and the second charge state each correspond to a first optical state of the electrically controllable optically active material.

2. The structure of claim 1, wherein the driver is further configured to:
subsequently discharge the electrically controllable optically active material in a second discharge process, including storing energy in the energy storage element released from the electrically controllable optically active material during second discharge process, and
subsequently charge the electrically controllable optically active material to the first charge state.

3. The structure of claim 1, wherein the driver is configured to deliver energy stored by the energy storage element during the first discharging process and/or the second discharging process to charge the electrically controllable optically active material to the first charge state and/or the second charge state.

4. The structure of claim 3, wherein the driver is configured to deliver energy from the power source in addition to delivery of energy stored by the energy storage element to charge the electrically controllable optically active material.

5. The structure of claim 1, wherein the energy storage element comprises a capacitor.

6. The structure of claim 1, wherein the first voltage comprises a rail voltage such that the first charge state comprises the rail voltage applied across the electrically controllable optically active material in a first polarity and the second charge state comprises the rail voltage applied across the electrically controllable optically active material in a second polarity opposite the first polarity.

7. The structure of claim 6, wherein the driver is configured to change the rail voltage between at least a first rail voltage and a second rail voltage, the first rail voltage being greater than the second rail voltage.

8. The structure of claim 7, wherein the first charge state and the second charge state at the first rail voltage each correspond to the first optical state of the electrically controllable optically active material and first charge state and the second charge state at the second rail voltage each correspond to a second optical state of the electrically controllable optically active material.

9. The structure of claim 8, wherein the first optical state is a transparent state and the second optical state is a privacy state.

10. The structure of claim 1, wherein the driver comprises:
a switching network comprising a plurality of switching mechanisms; and
a controller in communication with the switching network and being configured to switch the plurality of switching mechanisms between switching states in order to:
cause current to flow from the power source and through the electrically controllable optically active material in a first direction during a charging cycle;
stop current flowing through the electrically controllable optically active material; and
cause current to flow through the electrically controllable optically active material in a second direction opposite the first direction during a discharging cycle.

11. The structure of claim 10, wherein:
the energy storage element comprises a first energy storage element,
the driver further comprises a second energy storage element electrically coupled to at least one of the first electrode layer and the second electrode layer,
where the controller is further configured to switch the plurality of switching mechanisms between the plurality of switching states in order to transfer energy:
(i) from the power source to the electrically controllable optically active material during a first step of a charge cycle;
(ii) from the electrically controllable optically active material to the second energy storage element in a first step of a discharge cycle; and
(iii) from the second energy storage element to the first energy storage element during a second step of the discharge cycle.

12. The structure of claim 11, wherein the second energy storage element comprises an inductive energy storage element, and wherein transferring energy from the electrically controllable optically active material to the second energy storage element comprises discharging the electrically controllable optically active material by flowing current through the inductive second energy storage element such that energy is stored in the second energy storage element as a magnetic field.

13. The structure of claim 12, wherein the first energy storage element is a capacitive energy storage element, and wherein energy is transferred from the second energy storage element to the first energy storage element by flowing current from the second energy storage element to the first energy storage element.

14. The structure of claim 1, wherein:
the first pane of transparent material and the second pane of transparent material each comprise float glass;
the first electrode layer comprises a transparent conductive oxide coating deposited over the first pane of transparent material and the second electrode layer comprises a transparent conductive oxide coating deposited over the second pane of transparent material;
the electrically controllable optically active material is a liquid crystal material having a light transmittance that varies in response to application of an electrical field; and
the power source is wall power delivering alternating current.

15. An electrical driver for driving an electrically dynamic window structure comprising:
a power source,
a switching network comprising:
- a first switching mechanism coupled between a first side of a privacy structure and ground, the privacy structure comprising an electrically controllable optically active material positioned between a first electrode carried by a first pane of transparent material and a second electrode carried by second pane of transparent material;
- a second switching mechanism coupled between a second side of the privacy structure and ground;
- a third switching mechanism coupled between the power source and the first side of the privacy structure; and
- a fourth switching mechanism coupled between the power source and the second side of the privacy structure;

wherein the switching network is arranged in an H-bridge configuration to provide bidirectional power to the privacy structure;
a first energy storage element,
a second energy storage element coupled between the first side of the privacy structure and the first and third switching mechanisms;
a third energy storage element coupled between the second side of the privacy structure and the second and fourth switching mechanisms; and
a controller in communication with the switching network and configured to selectively switch the first, second, third, and fourth switching mechanisms such that:
- energy is transferred from the power source to the electrically controllable optically active material to charge the electrically controllable optically active material in a first polarity;
- energy is transferred from the electrically controllable optically active material to the second energy storage element and/or the third energy storage element; and
- energy is transferred from the second energy storage element and/or the third energy storage element to the first energy storage element.

16. The electrical driver of claim 15, wherein:
the first energy storage element is a capacitive energy storage element, and
the second and third energy storage elements are inductive elements.

17. The electrical driver of claim 16, wherein transferring energy from the electrically controllable optically active material to the second energy storage element and/or the third energy storage element comprises creating a current path in which:
- current flows from the electrically controllable optically active material through the second energy storage element and/or the third energy storage; and
- energy is stored in the inductive second energy storage element and/or the inductive third energy storage element as a magnetic field.

18. The electrical driver of claim 15, wherein the controller is configured to place the switching network into a first charging state by closing the third switching mechanism and the second switching mechanism to create a current path from the power source through the third switching mechanism, the second energy storage element, the privacy structure, the third energy storage element, and the second switching mechanism.

19. The electrical driver of claim 18, wherein:
the controller is configured to transition the switching network from the first charging state into a second charging state by opening the third switching mechanism and closing the first switching mechanism to create a current path comprising the privacy structure, the third energy storage element, the second switching mechanism, the first switching mechanism, and the second energy storage element; and
current flows through the privacy structure in a first direction in the first charging state and the second charging state such that energy is stored in the electrically controllable optically active material.

20. The electrical driver of claim 19, wherein the controller is configured to transition the switching network from the second charging state to a third charging state by opening one or both of the first switching mechanism and the second switching mechanism to eliminate current paths connected to the privacy structure so that the electrically controllable optically active material maintains a charge state.

21. A method for providing electrical power to a privacy structure and recapturing energy to a first energy storage element from the privacy structure, the privacy structure including an electrically controllable optically active material positioned between a first electrode layer and a second electrode layer, the method comprising:
arranging a plurality of switching mechanisms into a first charging configuration such that a current flows in a first current path from a power source to the first electrode layer of the privacy structure in a first direction;
arranging the plurality of switching mechanisms into a second charging configuration, the second charging configuration creating a second current path including the privacy structure and a second energy storage element such that current flows through the privacy structure in the first direction;
arranging the plurality of switching mechanisms into a third charging configuration, the third charging configuration eliminating current flow paths to and from the privacy structure and maintaining the privacy structure in a first charged state;
arranging the plurality of switching mechanisms into a first discharging configuration such that current flows through the second energy storage element and the privacy structure in a second direction opposite the first direction; and
arranging the plurality of switching mechanisms into a second discharging configuration such that current flows through the privacy structure in the second direction to the first energy storage element.

22. The method of claim 21, wherein the first charging configuration and the second discharging configuration are the same.

23. The method of claim 21, wherein the second charging configuration and the first discharging configuration are the same.

24. The method of claim 21, further comprising arranging the plurality of switching mechanisms into a first reverse charging configuration such that current flows from the power source, through the privacy structure in the second direction, and through the second energy storage element.

25. The method of claim 24 further comprising switching back and forth between the second discharging configuration and the first reverse charging configuration a plurality of times to discharge the privacy structure.

* * * * *